(12) United States Patent
Zhang et al.

(10) Patent No.: US 11,743,742 B2
(45) Date of Patent: Aug. 29, 2023

(54) BEAM SWEEP BASED RANDOM ACCESS MSG 3 AND MSG 4

(71) Applicant: QUALCOMM Incorporated, San Diego, CA (US)

(72) Inventors: Qian Zhang, Basking Ridge, NJ (US); Yan Zhou, San Diego, CA (US); Tao Luo, San Diego, CA (US); Mostafa Khoshnevisan, San Diego, CA (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 1 day.

(21) Appl. No.: 17/214,641

(22) Filed: Mar. 26, 2021

(65) Prior Publication Data
US 2021/0306865 A1   Sep. 30, 2021

Related U.S. Application Data

(60) Provisional application No. 63/003,224, filed on Mar. 31, 2020.

(51) Int. Cl.
*H04W 16/28* (2009.01)
*H04W 72/044* (2023.01)
(Continued)

(52) U.S. Cl.
CPC ......... *H04W 16/28* (2013.01); *H04W 72/046* (2013.01); *H04W 72/23* (2023.01); *H04W 74/0833* (2013.01)

(58) Field of Classification Search
CPC . H04W 16/28; H04W 72/042; H04W 72/046; H04W 74/0833; H04W 76/15;
(Continued)

(56) References Cited

U.S. PATENT DOCUMENTS

2013/0182680 A1* 7/2013 Choi .................. H04W 36/14
370/331
2013/0286960 A1* 10/2013 Li .................. H04B 7/0617
370/329
(Continued)

FOREIGN PATENT DOCUMENTS

WO    2018084663 A1    5/2018
WO    2020164442 A1    8/2020

OTHER PUBLICATIONS

International Search Report and Written Opinion—PCT/US2021/024705—ISA/EPO—dated Jul. 20, 2021.
(Continued)

*Primary Examiner* — Kiet Tang
(74) *Attorney, Agent, or Firm* — Danai Nelisile Mhembere; Procopio, Cory, Hargreaves & Savitch LLP

(57) ABSTRACT

A method, a computer-readable medium, and an apparatus are provided for wireless communication including random access between a base station and a user equipment (UE). The UE transmits a first random access message to a serving cell. The UE receives a second random access message from the serving cell, in response to the first random access message. The UE transmits a third random access message to one or more transmission reception points of the serving cell in a beam sweep pattern for reception on multiple beams and using resources based on at least one of a beam pool index or a TRP index.

30 Claims, 19 Drawing Sheets

(51) Int. Cl.
*H04W 74/08* (2009.01)
*H04W 72/23* (2023.01)

(58) Field of Classification Search
CPC ..... H04W 36/14; H04B 7/088; H04B 7/0695; H04L 5/0051
See application file for complete search history.

(56) References Cited

U.S. PATENT DOCUMENTS

| | | | |
|---|---|---|---|
| 2017/0195033 | A1 | 7/2017 | Zhang et al. |
| 2017/0231011 | A1 | 8/2017 | Park et al. |
| 2018/0020487 | A1 | 1/2018 | Tsai et al. |
| 2018/0070380 | A1* | 3/2018 | Nagaraja ............... H04W 16/28 |
| 2018/0092129 | A1 | 3/2018 | Guo et al. |
| 2018/0124837 | A1 | 5/2018 | Yu et al. |
| 2018/0167979 | A1 | 6/2018 | Guo et al. |
| 2018/0235013 | A1 | 8/2018 | Jung et al. |
| 2018/0279380 | A1 | 9/2018 | Jung et al. |
| 2019/0029036 | A1* | 1/2019 | John Wilson ..... H04W 74/0833 |
| 2019/0037426 | A1 | 1/2019 | Yu et al. |
| 2019/0075600 | A1 | 3/2019 | Kwon et al. |
| 2019/0174346 | A1 | 6/2019 | Murray et al. |
| 2019/0182870 | A1 | 6/2019 | Shih et al. |
| 2019/0215220 | A1 | 7/2019 | Islam et al. |
| 2019/0215896 | A1 | 7/2019 | Zhou et al. |
| 2019/0319833 | A1 | 10/2019 | Nagaraja et al. |
| 2019/0327767 | A1 | 10/2019 | Islam et al. |
| 2019/0349854 | A1 | 11/2019 | Nagaraja et al. |
| 2019/0357263 | A1 | 11/2019 | Yuan et al. |
| 2019/0380139 | A1 | 12/2019 | Xiong et al. |
| 2020/0015273 | A1 | 1/2020 | Zhang et al. |
| 2020/0053607 | A1 | 2/2020 | Ingale et al. |
| 2020/0136708 | A1 | 4/2020 | Pan et al. |
| 2020/0137806 | A1 | 4/2020 | Islam et al. |
| 2020/0145079 | A1 | 5/2020 | Marinier et al. |
| 2020/0296635 | A1 | 9/2020 | Rastegardoost et al. |
| 2020/0314913 | A1 | 10/2020 | Rastegardoost et al. |
| 2021/0050968 | A1* | 2/2021 | Yi ......................... H04L 5/0051 |
| 2021/0058285 | A1 | 2/2021 | Wu et al. |
| 2021/0160923 | A1 | 5/2021 | Zhang et al. |
| 2021/0195650 | A1 | 6/2021 | Zhang et al. |
| 2021/0195651 | A1 | 6/2021 | Zhang et al. |
| 2021/0410187 | A1* | 12/2021 | Yang ................. H04W 74/0816 |
| 2022/0167279 | A1 | 5/2022 | Zhou et al. |

OTHER PUBLICATIONS

Qualcomm Incorporated: "Beam Aware RACH Procedure and Beam Refinement During Handover", 3GPP Draft, 3GPP TSG-RAN WG2 Meeting #99, R2-1709091, 3RD Generation Partnership Project (3GPP), Mobile Competence Centre, 650, Route Des Lucioles, F-06921 Sophia-Antipolis Cedex, France Aug. 25, 2017 (Aug. 25, 2017), XP051318883, pp. 1-7, Retrieved from the Internet: URL:http://www.3gpp.org/ftp/Meetings_3GPP_SYNC/RAN2/Docs/section 2.

* cited by examiner

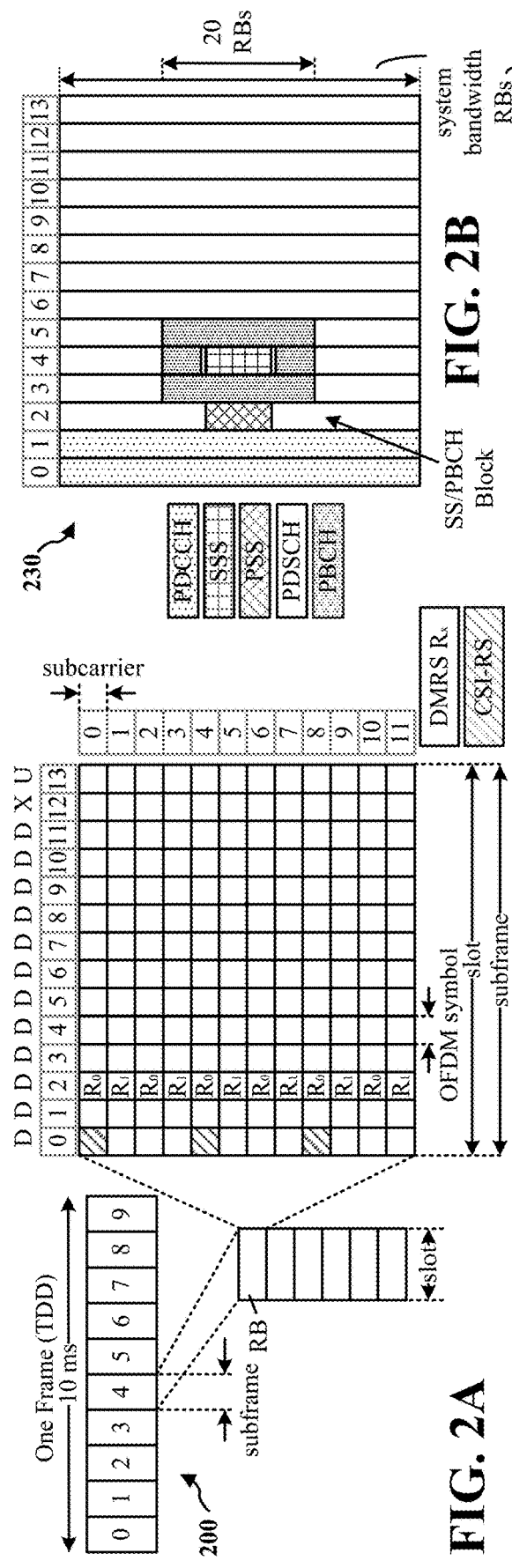
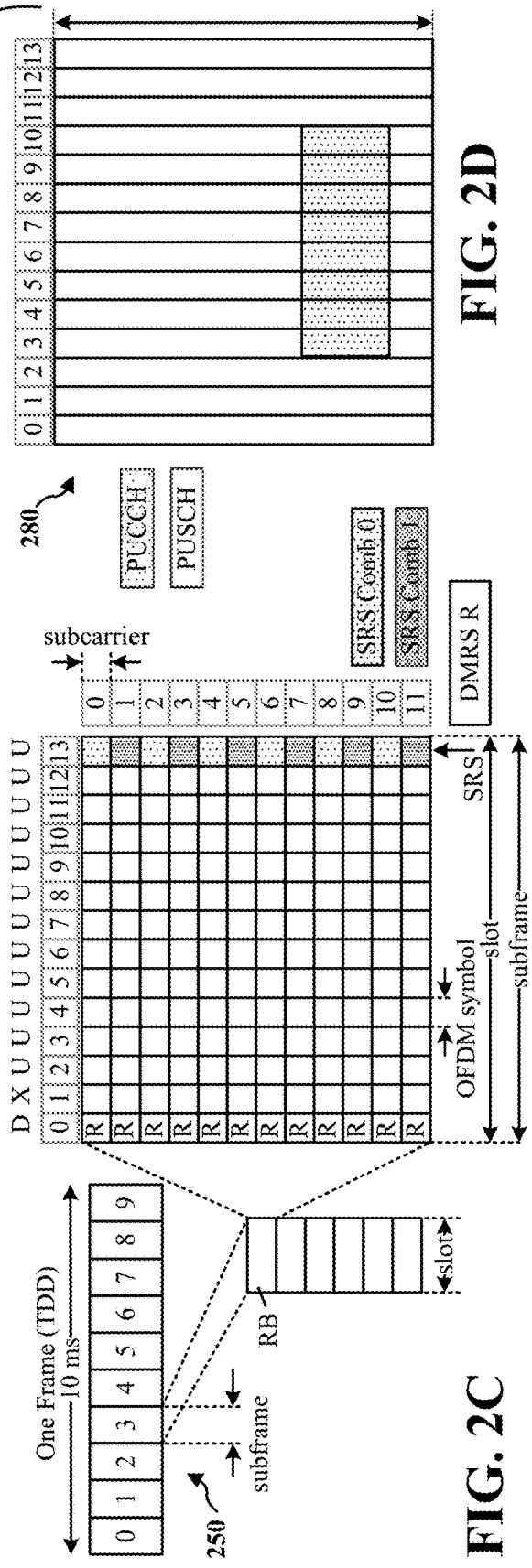

BEAM SWEEP BASED RANDOM ACCESS MSG 3 AND MSG 4

CROSS REFERENCE TO RELATED APPLICATION(S)

This application claims the benefit of priority of Provisional Application Ser. No. 63/003,224, entitled "BEAM SWEEP BASED RANDOM ACCESS MSG 3 AND MSG 4" and filed on Mar. 31, 2020, which is expressly incorporated by reference herein in its entirety.

INTRODUCTION

The present disclosure relates generally to communication systems, and more particularly, to wireless communication including random access.

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method is provided for wireless communication at a user equipment (UE). The method includes transmitting a first random access message to a serving cell receiving a second random access message from the serving cell, in response to the first random access message. The method further includes transmitting a third random access message to one or more transmission reception points (TRPs) of the serving cell in a beam sweep pattern for reception on multiple beams and using resources based on at least one of a beam pool index or a TRP index. The method may further include receiving an indication of a set of beams for receiving a fourth random access message and receiving the fourth random access message from the one or more TRPs of the serving cell on the set of beams.

In another aspect of the disclosure, an apparatus for wireless communication at a UE is provided. The apparatus includes means for transmitting a first random access message to a serving cell. The apparatus includes means for receiving a second random access message from the serving cell, in response to the first random access message. The apparatus includes means for transmitting a third random access message to one or more TRPs of the serving cell in a beam sweep pattern for reception on multiple beams and using resources based on at least one of a beam pool index or a TRP index. The apparatus may further include means for receiving an indication of a set of beams for receiving a fourth random access message and receiving the fourth random access message from the one or more TRPs of the serving cell on the set of beams.

In another aspect of the disclosure, an apparatus for wireless communication at a UE is provided. The apparatus includes a memory and at least one processor coupled the memory. The memory and at least one processor are configured to transmit a first random access message to a serving cell, receive a second random access message from the serving cell, in response to the first random access message, and transmit a third random access message to one or more TRPs of the serving cell in a beam sweep pattern for reception on multiple beams and use resources based on at least one of a beam pool index or a TRP index. The memory and at least one processor may further be configured to receive an indication of a set of beams for receiving a fourth random access message and receiving the fourth random access message from the one or more TRPs of the serving cell on the set of beams.

In another aspect of the disclosure, a non-transitory computer-readable storage medium storing computer executable code for wireless communication at a UE is provided. The code when executed by a processor causes the processor to transmit a first random access message to a serving cell, receive a second random access message from the serving cell, in response to the first random access message, and transmit a third random access message to one or more TRPs of the serving cell in a beam sweep pattern for reception on multiple beams and use resources based on at least one of a beam pool index or a TRP index. The code may further cause the processor to receive an indication of a set of beams for receiving a fourth random access message and receiving the fourth random access message from the one or more TRPs of the serving cell on the set of beams.

In another aspect of the disclosure, a method is provided for wireless communication at a base station. The method includes receiving a first random access message from a UE and transmitting a second random access message to the UE, in response to the first random access message. The method includes receiving a third random access message at one or more TRPs on at least one of multiple beams that are monitored in a beam sweep pattern using resources based on at least one of a beam pool index or a TRP index. The method may further include transmitting an indication of a set of beams for a fourth random access message and transmitting the fourth random access message from the one or more TRPs on the set of beams.

In another aspect of the disclosure, an apparatus for wireless communication at a base station is provided. The apparatus includes means for receiving a first random access message from a UE and means for transmitting a second random access message to the UE, in response to the first random access message. The apparatus includes means for receiving a third random access message at one or more TRPs on at least one of multiple beams that are monitored in a beam sweep pattern using resources based on at least one of a beam pool index or a TRP index. The apparatus may further include means for transmitting an indication of a set of beams for a fourth random access message and transmitting the fourth random access message from the one or more TRPs on the set of beams.

In another aspect of the disclosure, an apparatus for wireless communication at a base station is provided. The apparatus includes a memory and at least one processor coupled the memory. The memory and at least one processor are configured to receive a first random access message from a UE, transmit a second random access message to the UE, in response to the first random access message, and receive a third random access message at one or more TRPs on at least one of multiple beams that are monitored in a beam sweep pattern using resources based on at least one of a beam pool index or a TRP index. The memory and at least one processor may further be configured to transmit an indication of a set of beams for a fourth random access message and transmitting the fourth random access message from the one or more TRPs on the set of beams.

In another aspect of the disclosure, a non-transitory computer-readable storage medium storing computer executable code for wireless communication at a base station is provided. The code when executed by a processor causes the processor to receive a first random access message from a UE, transmit a second random access message to the UE, in response to the first random access message, and receive a third random access message at one or more TRPs on at least one of multiple beams that are monitored in a beam sweep pattern using resources based on at least one of a beam pool index or a TRP index. The code may further cause the processor to transmit an indication of a set of beams for a fourth random access message and transmitting the fourth random access message from the one or more TRPs on the set of beams.

To the accomplishment of the foregoing and related ends, the one or more aspects comprise the features hereinafter fully described and particularly pointed out in the claims. The following description and the annexed drawings set forth illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.

DETAILED DESCRIPTION

Figure 1:
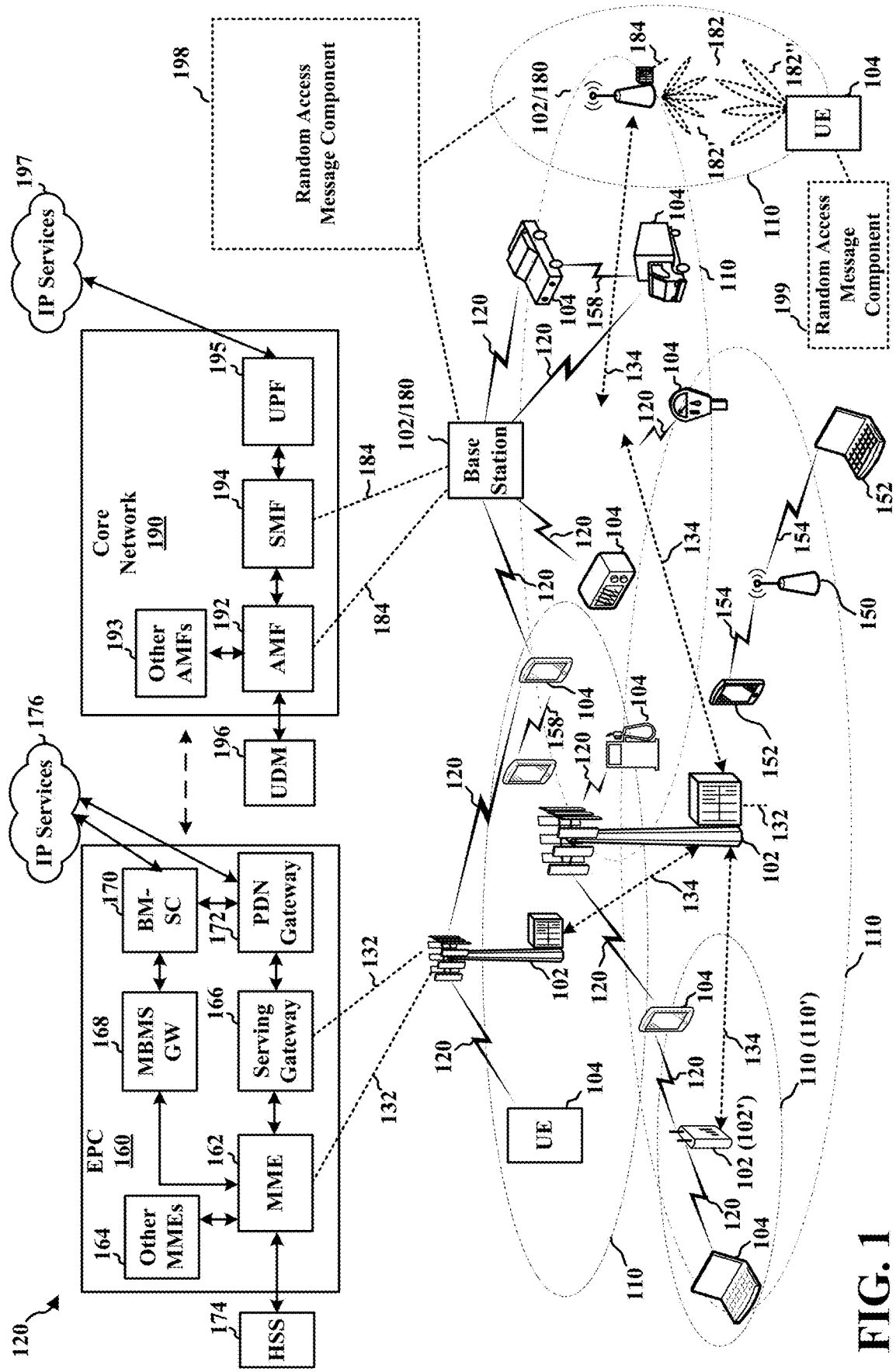
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example examples, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

Aspects presented herein improve the reliability and reduce latency for a RACH procedure between a UE and a base station through the transmission of one or more random access messages based on beam sweeping. For example, a UE may transmit multiple third random access messages (e.g., Msg 3) over multiple beams based on beam sweeping for reception at one or more beams of a base station or one or more beams of TRP(s) of the base station. As such, if the base station or a TRP of the base station is able to receive at least one of the third random access messages (e.g., Msg 3) at one of its beams, the RACH procedure may be able to proceed. In another aspect, the base station may transmit multiple fourth random access messages (e.g., Msg 4) based on beam sweeping. For example, a base station or TRP(s) of the base station may transmit multiple fourth random access messages over multiple beams based on beam sweeping to a UE. As such, if the UE is able to receive at least one of the fourth random access messages at one of its beams, the RACH procedure may be completed even if other fourth random access messages are not received on other beams of the UE.

FIG. 1 is a diagram illustrating an example of a wireless communications system and an access network 100 including UEs 104 and base stations 102, 180. A UE 104 may include a random access message component 199 configured to exchange random access messages with a cell using multiple beam directions 182"). The base station 102 and/or 180 may include a random access message component 198 configured to exchange random access messages with the UE 104 using multiple beams (e.g., beam directions 182'). The random access message component 199 of the UE may be configured to transmit a third random access message using a number of transmitting beams, e.g., based on beam sweep information provided by the base station 102/180 in a second random access message (e.g., uplink grant). Additionally, or alternatively, the random access message component 199 may be configured to receive a fourth random access from the base station 102/180 using a beam sweeping pattern.

Although the following description may be focused on 5G NR, the concepts described herein may be applicable to other similar areas, such as LTE, LTE-A, CDMA, GSM, and other wireless technologies.

The random access message component 198 of the base station 102/180 may be configured to receive a third random access message using a number of transmitting beams. The random access message component 198 may be configured to provide beam sweep information to the UE, e.g., in a second random access message (e.g., uplink grant). Additionally, or alternatively, the random access message component 198 may be configured to transmit a fourth random access to the UE 104 using a beam sweeping pattern.

The wireless communications system in FIG. 1 may be referred to as a wireless wide area network (WWAN). The wireless communication system may include base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Some UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

A base station 102, whether a small cell 102' or a large cell (e.g., macro base station), may include and/or be referred to as an eNB, gNodeB (gNB), or another type of base station. Some base stations 180, such as a gNB, may operate in a traditional sub 6 GHz spectrum, in millimeter wave (mmW) frequencies, and/or near mmW frequencies in communication with the UE 104. When the gNB, e.g., base station 180, operates in mmW or near mmW frequencies, the gNB may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station, e.g., base station 180, may utilize beamforming 182 with the UE 104 to compensate for the extremely high path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. User Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. User Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu * 15$ kHz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 2A-2D provide an example of slot configuration 0 with 14 symbols per slot and numerology $\mu=0$ with 1 slot per subframe. The subcarrier spacing is 15 kHz and symbol duration is approximately 66.7 µs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
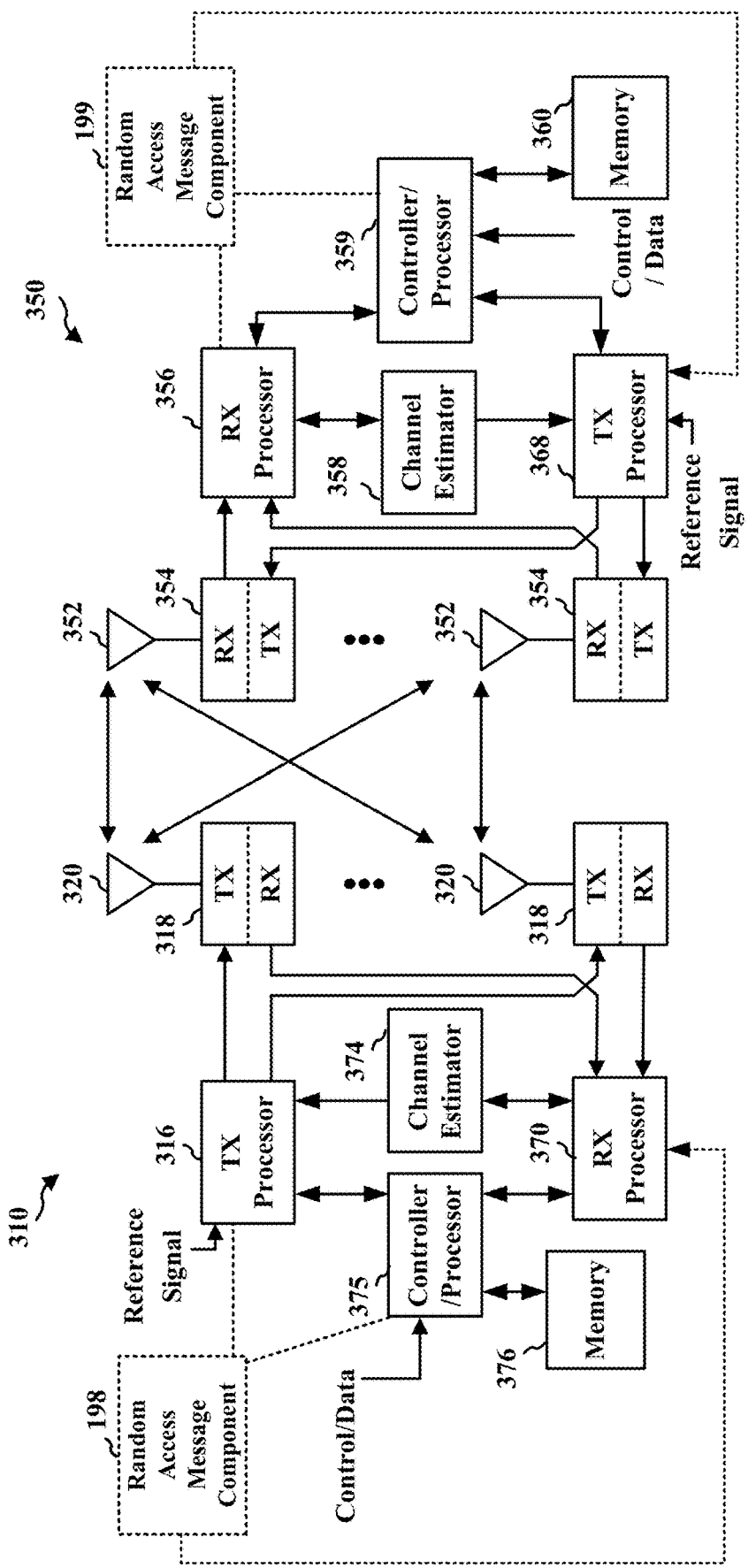
FIG. 3 is a diagram illustrating an example of a base station and UE in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with the random access message component 199 of FIG. 1.

At least one of the TX processor 316, the RX processor 370, and the controller/processor 375 may be configured to perform aspects in connection with the random access message component 198 of FIG. 1.

Figure 4:
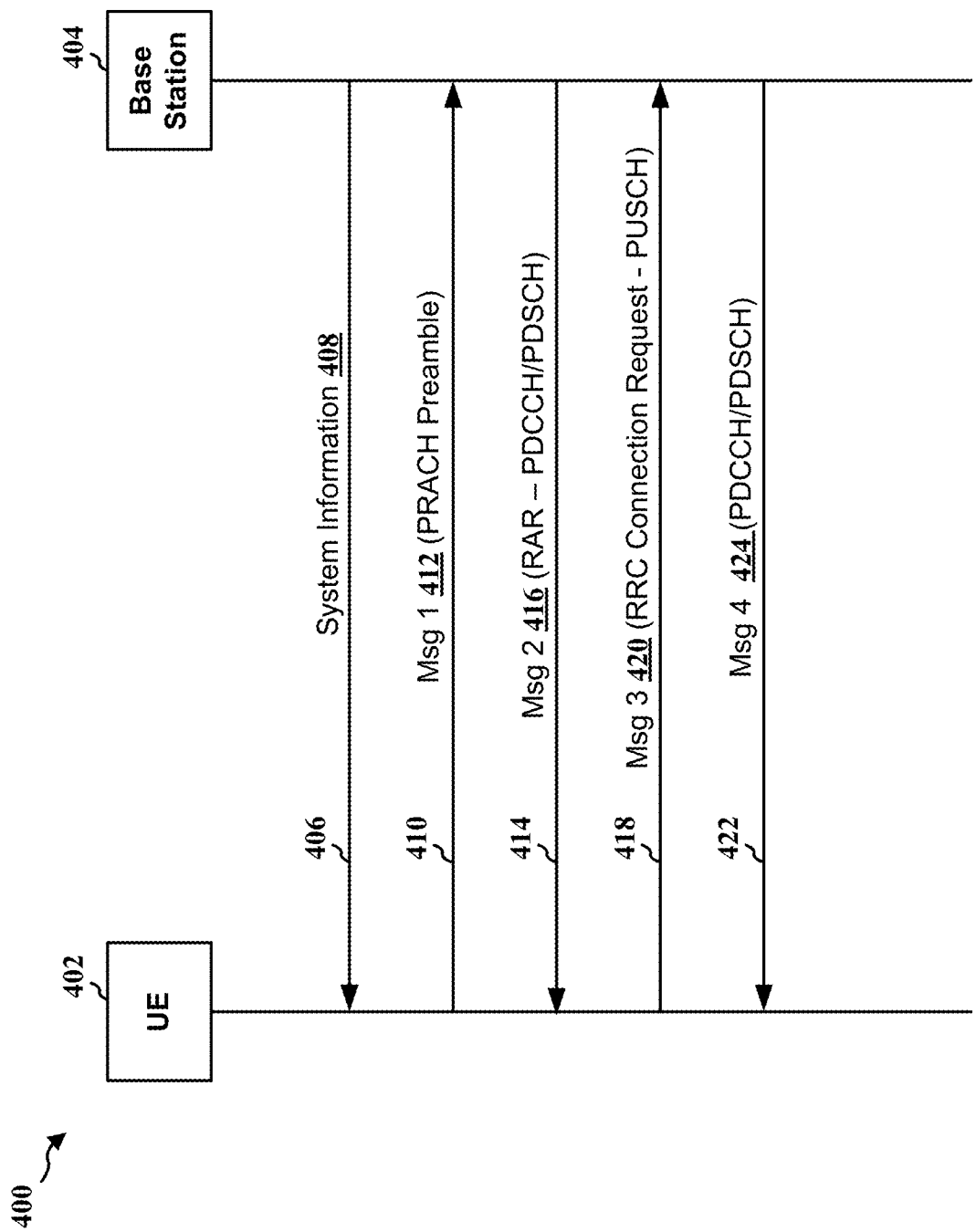
FIG. 4 illustrates a communication flow between a UE and a base station including a RACH procedure.

A UE may use a random access channel (RACH) procedure, which may also be referred to as a "random access procedure," in order to initiate communication with a base station, such as to request an RRC connection, to re-establish an RRC connection, and/or to resume an RRC connection with the base station, etc. FIG. 4 is a communication flow 400 illustrating example aspects of a RACH procedure between a UE 402 and a base station 404. At 410, the UE 402 may initiate a random access message exchange (e.g., the RACH procedure) by sending, to the base station 404, a first random access message 412 (e.g., Msg 1), which may include a preamble. Prior to sending the first random access message 412, the UE may obtain random access parameters, e.g., including preamble format parameters, time and frequency resources, parameters for determining root sequences and/or cyclic shifts for a random access preamble, etc., e.g., in system information 408 transmitted/broadcasted from the base station 404, such as shown at 406. The preamble may be transmitted with an identifier, such as a random access RNTI (RA-RNTI). The UE 402 may randomly select a random access preamble sequence, e.g., from a set of preamble sequences. In some examples, a preamble sequence may be assigned to the UE 402.

At 414, the base station may respond to the first random access message 412 by sending a second random access message 416 (e.g. Msg 2), where the second random access message 416 may be a PDSCH and/or a PDCCH that include a random access response (RAR). The RAR may include, e.g., an identifier of the random access preamble sent by the UE, a timing advance (TA), an uplink grant for the UE to transmit data, cell radio network temporary identifier (C-RNTI) or other identifier, and/or a back-off indicator, etc. At 418, after receiving the second random access message 416, the UE 402 may transmit a third random access message 420 (e.g., Msg 3) to the base station 404, such as via a PUSCH which may include an RRC connection request, an RRC connection re-establishment request, or an RRC connection resume request depending on the trigger for the initiating the RACH procedure. At 422, the base station 404 may complete the RACH procedure by sending a fourth random access message 424 (e.g., Msg 4) to the UE 402, where the fourth random access massage may include a PDCCH for scheduling and a PDSCH for carrying message. For example, the fourth random access message 424 may include a random access response message that includes timing advancement information, contention resolution information, and/or RRC connection setup information. The UE 402 may monitor for the PDCCH in the fourth random access message 424, such as based on the C-RNTI. If the PDCCH is successfully received and decoded, the UE 402 may also decode the PDSCH corresponding to the PDCCH. The UE 402 may send HARQ feedback for any data carried in the fourth random access message. In some examples, the fourth random access message may be referred to as a contention resolution message. The fourth random access message 424 may complete the RACH procedure. Thus, the UE 402 may then transmit uplink communication and/or receive downlink communication with the base station 404 based on the RAR (e.g., from the second random access message 416) and the fourth random access message 424. As four random access messages may be exchanged during a RACH procedure, a RACH procedure may also be referred to as a four-step RACH procedure.

Figure 5:
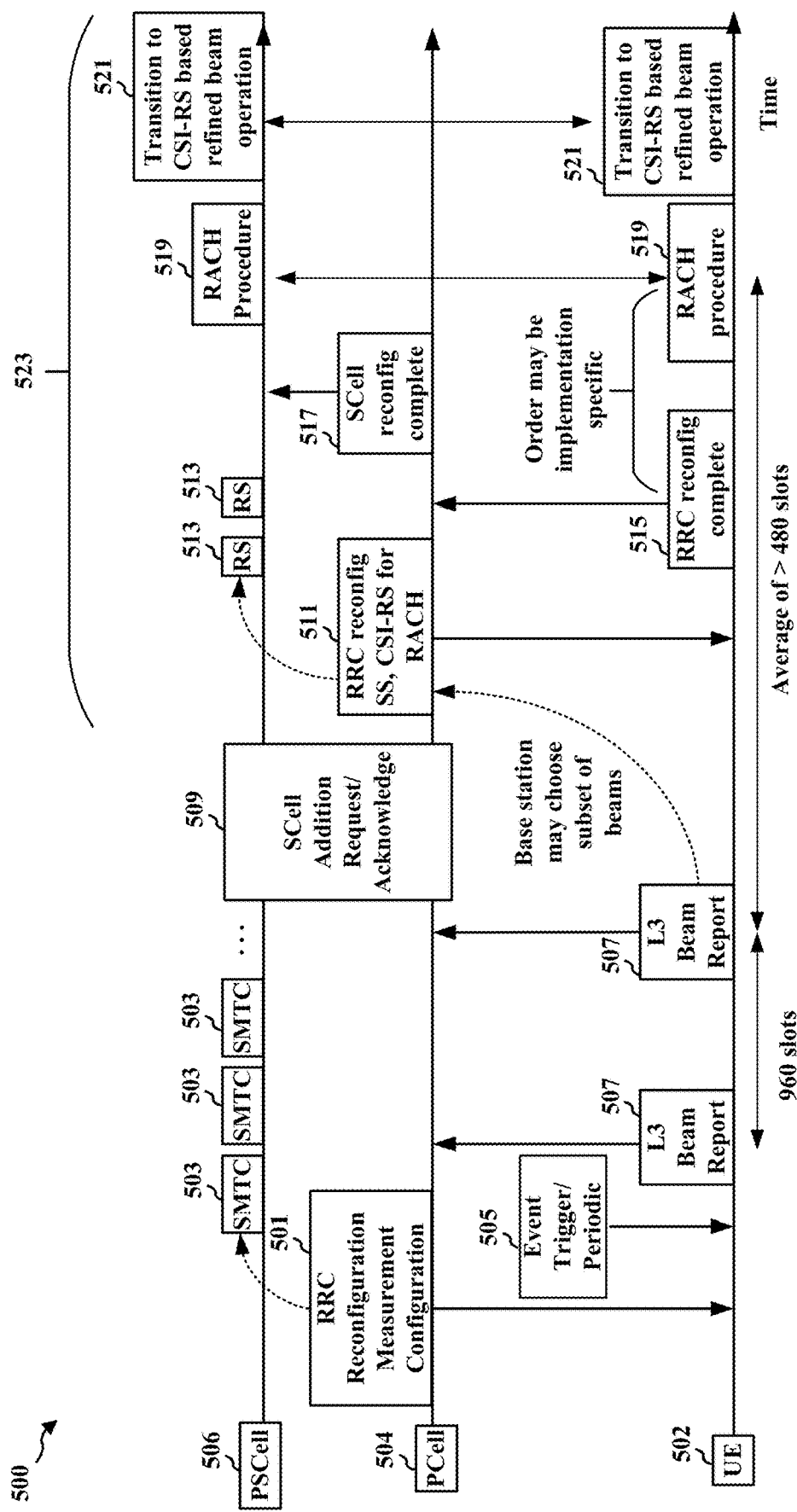
FIG. 5 illustrates an example of communication for a UE to perform random access with a primary secondary cell (PSCell).

FIG. 5 is a communication flow 500 illustrating an example of a UE 502 performing a RACH procedure with a secondary cell, such as a primary secondary cell (PSCell) 506 (e.g., a secondary node (SN)), based on a configuration that is received from a primary cell (PCell) 504 (e.g., a master node (MN)) serving the UE 502. As illustrated in FIG. 5, the PCell 504 may transmit a configuration 501 to the UE 502, where the configuration 501 may configure the UE 502 to perform Layer 3 (L3) measurements (e.g., beam measurements) on another cell, such as the PSCell 506. The PSCell 506 may belong to a secondary cell group (SCG), where the SCG may include the PSCell 506 and one or more secondary serving cells (SSCells). Although aspects presented herein are illustrated for a PSCell, the aspects may also be applied to an SCell. In some examples, the UE 502 may use the configuration 501 that is received from the PCell 504 to measure synchronization signal blocks (SSBs)/physical broadcasting channel (PBCH) transmitted from the PSCell 506. For example, the UE 502 may perform the synchronization signal measurements in corresponding SS/PBCH block (or SSB-based) measurement time configuration (SMTC) windows 503. The SMTC windows 503 may be configured by the PCell 504, e.g., via the configuration 501. An example of the SS/PBCH block may be illustrated by diagram 230 of FIG. 2B. After the UE 502 performs the L3 measurement on the PSCell's SSBs, the UE 502 may transmit a beam report 507 (e.g., an L3 beam report) to the PCell 504 that includes one or more beam measurements for the PSCell 506. The UE 502 may provide the beam report 507 to the PCell 504 in response to an event trigger 505. In one example, the beam report 507 may be a periodic report, and the UE 502 may provide the beam report 507 to the PCell 504 in a periodic manner.

After the PCell 504 receives the beam report 507 from the UE 502, the PCell 504 may use the beam report 507 that includes beam measurements for the PSCell 506 to initiate a PSCell addition request procedure 509 for the UE 502, where the PCell 504 may transmit an RRC reconfiguration 511 to the UE 502 to initiate an RRC reconfiguration for the UE 502. After the UE 502 completes the RRC reconfiguration, the UE 502 may transmit an RRC reconfiguration complete indication 515 to the PCell 504 indicating that the RRC reconfiguration has been completed. Then, the PCell 504 may also transmit an RRC reconfiguration complete indication 517 to the PSCell 506 to inform the PSCell 506 that the RRC reconfiguration has been completed for the UE 502. In one example, the UE 502 may identify a best downlink beam (e.g., an RS beam) for the PSCell 506 based on measuring reference signals (e.g., RS 513) transmitted from the PSCell 506, and the UE 502 may use the identified best downlink beam to perform/initiate a RACH procedure 519 with the PSCell 506. For example, the UE 502 may transmit a first random access message (e.g., the Msg 1 412) to the PSCell 506 during a corresponding RACH occasion. Following the transmission of the first random access message, the PSCell 506 and the UE 502 may exchange a second random access message (e.g., 416), s third random access message (e.g., 420), and/or a fourth random access message (e.g., 424) for the RACH procedure 519, such as described in connection with FIG. 4. In one example, one or more random access messages of the RACH procedure 519, e.g., the second, third and/or fourth random access messages, may be exchanged between the UE 502 and the PSCell 506 using the same beam pair as the first random access messages, and the random access messages may include aspects described in connection with the random access messages described in connection with FIG. 4. After completing the RACH procedure 519, the UE 502 and the PSCell 506 may transition to a CSI-RS based refined beam operation 521, where the UE 502 may measure CSI-RS transmitted from different beams of the PSCell 506. Then, the UE 502 may provide a beam measurement report to the PSCell 506 for beam selection.

Figure 6:
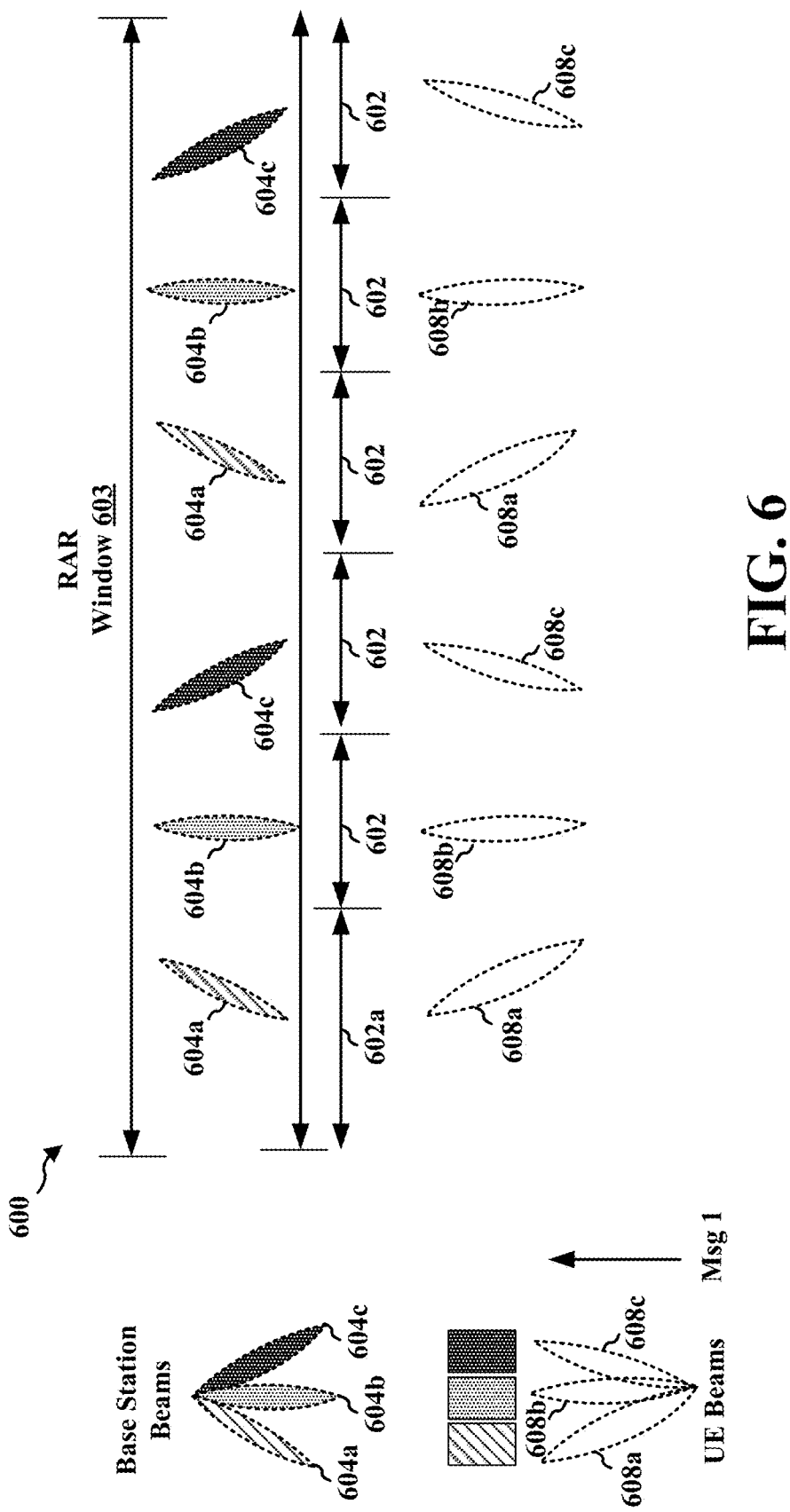
FIG. 6 illustrates an example of beam use in connection with random access.

A UE with beam correspondence with a base station may obtain multi-beam diversity during a random access transmission by transmitting multiple Msg 1 transmissions, where each Msg 1 transmission may be transmitted using a different beam of the UE. The beam correspondence may refer to the UE's ability to select a suitable beam for UL transmission based on DL measurements. FIG. 6 is a diagram 600 illustrating an example of a multiple Msg 1 transmission which may be performed by a UE within an RAR window 603, e.g., during portions 602 of the RAR window 603. The RAR window 603 may correspond to a window of time in which the UE receives an RAR (e.g., the Msg 2). The beams, e.g., 604a, 604b, and 604c, may correspond to different SSBs and/or different CSI-RS. As shown by FIG. 6, a beam correspondence may be configured between one or more UE beams (e.g., beams 608a, 608b, and 608c) and one or more base station beams (e.g., reference signals associated with the one or more base station beams). For example, the UE beam 608a may correspond to a reference signal associated with the base station beam 604a, the UE beam 608b may correspond to a reference signal associated with the base station beam 604b, and the UE beam 608c may correspond to a reference signal associated with the base station beam 604c, etc. As such, the UE may transmit the Msg 1 (e.g., the first random access message) multiple times using different beams (e.g., one or more Msg 1 per UE beam). In one example, with the beam correspondence, the uplink transmission beam may be the same as the downlink reception beam for the UE. In another example, the UE may perform an uplink beam sweep, and then the UE may select one or more uplink transmission beams for the Msg 1 beam sweep based at least in part on the uplink beam sweep. In some examples, the UE with beam correspondence may have full flexibility to use any uplink transmission beam (e.g., beam 608a, 608b, 608c) to transmit multiple Msg 1 random access transmissions corresponding to different SSBs/CSI-RS. In other examples, the RAR window 603 may be interleaved for different transmission beams.

In one example, the UE may use portions of the RAR window 603 to monitor for a Msg 2 from the base station using different reception beams, e.g., beams 608a, 608b, 608c. The UE and the base station may be synchronized in order for the base station to determine the beam that the UE may use for monitoring for the Msg 2 within different portions 602 of the RAR window. For example, during a particular portion 602a of the RAR window 603, the base station may determine that the UE is using the reception beam 608a that corresponds to the reference signal associated with the transmitting beam 604a of the base station. Thus, the base station may use the beam 604a to transmit the Msg 2 during the portion 602a. The base station may transmit multiple Msg 2 that include the RAR using different beams of the base station during different portions 602 of the RAR window 603.

Aspects presented herein may provide coverage and/or latency improvements between a UE and a cell, such as when a UE is switching from one cell to another cell as shown by 523 of FIG. 5. Aspects presented herein may increase the reliability of transmissions between a UE and a cell by enabling multiple transmission opportunities in the time and/or frequency domain for uplink transmissions or channels, such as random access transmissions or a RACH procedure. The multiple (or additional) transmission opportunities may improve the reliability for communications, such as communications involving unlicensed spectrum, by increasing the likelihood that a RACH procedure between a UE and a base station (e.g., a secondary cell such as a PSCell) is successful. The increased reliability may be utilized to enhance or support services such as URLLC services, IoT services including industrial IoT (IIoT) services, NR based communication in an unlicensed spectrum (such as FR1) in a controlled environment, etc. Aspects of the present disclosure may also increase random access reliability and robustness through the use of beam sweeping during a RACH procedure between a UE and a cell (e.g., a PCell, an SCell, or a PSCell, etc.).

In one aspect of the present disclosure, a UE may exchange one or more random access messages (e.g., Msg 1, Msg 2, Msg, 3 and/or Msg 4 etc.) with a cell based on beam sweeping, which is described in connection with FIGS. 6 to 12. In one example, the beam sweeping may be based on time division multiplexing (TDM), frequency division multiplexing (FDM), space division multiplexing (SDM) or a combination thereof, such that the UE may exchange one or more random access messages with a single transmission reception point (TRP) or with multiple TRPs of a serving cell. In another example, one or more candidate beam pools may be provided for a RACH procedure, where each beam pool may be associated with a beam pool index that may be used by a UE to avoid potential beam pairing misalignment, which may occur when the UE is communicating with one or more TRPs of a cell based on beam sweeping. In addition, when a UE is communicating with one or more TRPs, each TRP may be associated with a TRP index or identifier in which the UE may use for differentiating TRPs. For example, when a random access procedure involves multiple TRPs, beam pool indexes and/or TRP indexes may enable a UE to select random access beams from different TRPs with large angle of departure (AoD), which may improve uplink interference diversity. In some examples, applying beam sweeping to one or more random access messages may provide load balance between multiple TRPs. For example, based on the beam sweeping of one or more random access messages, a UE may select a TRP with less or no urgent traffic for communication. Applying beam sweeping for random access messages (e.g., joint random access beam sweeps) may also improve the rate of a RACH procedure being successfully completed. For example, as long as one path among the multiple transmissions of different random access message exchanges get through (e.g., received by the UE and/or the cell), the initial access or the RACH procedure may be successfully completed. The beam sweeping during random access may help to avoid blockages during the initial access procedure with the cell. The added transmissions of the beams sweep may help to avoid failure due to a burst of uplink or downlink inter-cell interference. For example, the random access using beam sweeping for one or more random access message(s) may reduce random access latency and provide for a faster PSCell set up procedure having reduced failures or retransmissions.

Figure 7A:
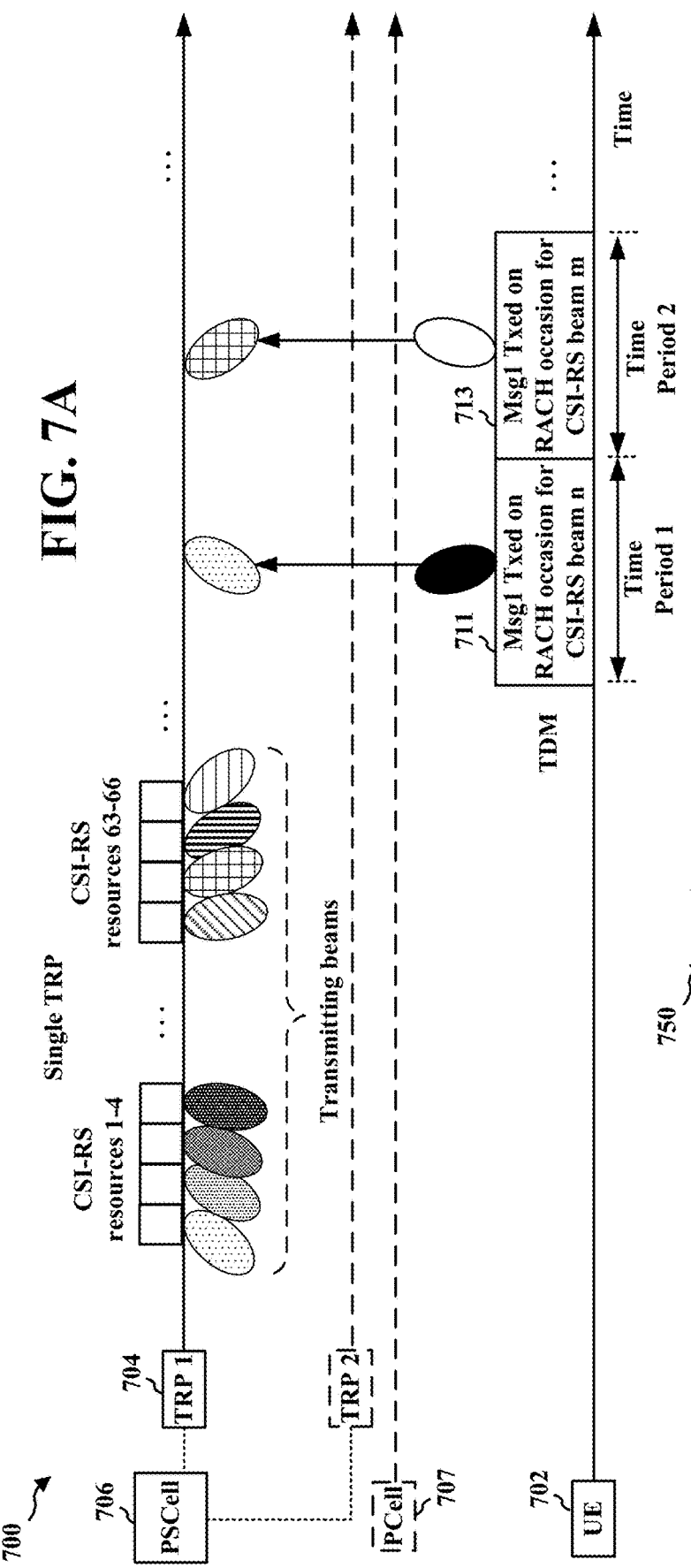
FIGS. 7A and 7B illustrate example aspects of random access between a UE and a cell having a single transmission reception point (TRP) using multiple beams according to aspects of the present disclosure.
Figure 7B:
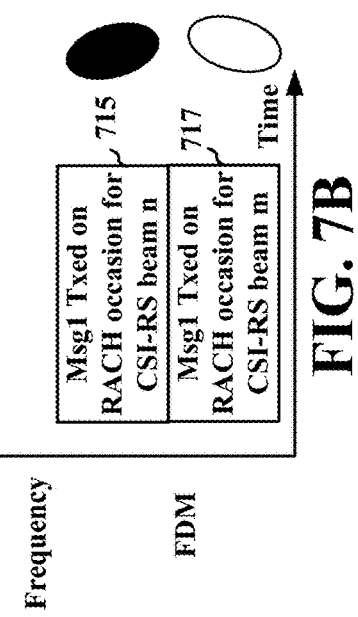

FIG. 7A is a diagram 700 illustrating an example of a RACH procedure between a UE 702 and one of TRPs, e.g., a first TRP 704, of a PSCell 706 according to aspects of the present disclosure. Optional aspects are illustrated with a dashed line. The RACH procedure may correspond to the RACH procedure described in connection with 519 of FIG. 5, and may also include exchange of one or more random access messages as described in connection with FIG. 4. In one example, the PSCell 706 may transmits reference signals from the first TRP 704, such as channel state information reference signal (CSI-RS), based on beam sweeping. For example, the first TRP 704 may transmit each CSI-RS within a set of CSI-RS resources using a different transmitting beam, e.g., the first TRP 704 may transmit a first CSI-RS resource (e.g., resource #1) using a first beam, a second CSI-RS resource (e.g., resource #2) using a second beam, a third CSI-RS resource (e.g., resource #3) using a third beam, and a $N^{th}$ CSI-RS resource (e.g., resource #N) using a $N^{th}$ beam, etc. For example, as shown by diagram 700 of FIG. 7A, the first TRP 704 may transmit CSI-RS using CSI-RS resources one (1) to sixty-six (66) using different beams (e.g., sixty-six beams that correspond to the sixty-six CRI-RS resources). Based on the CSI-RS transmitted from different beams of the first TRP 704, the UE 702 may transmit multiple Msg 1 (e.g., a first random access message corresponding to 412 that includes a permeable) to one or more beams (e.g., reception beams) of the first TRP 704. For example, the UE 702 may use a number X of selected reference signals (e.g., CSI-RS) received from the first TRP 704 on X allocated random access occasions, where the allocated random access occasions may correspond to X reference signals of the first TRP 704.

In some examples, the UE 702 may transmit multiple Msg 1 based on TDM, FDM, SDM, or a combination thereof. As shown by diagram 700 of FIG. 7A, the UE 702 may transmit multiple Msg 1 based on TDM, where the UE 702 may transmit multiple Msg 1 at different time periods and optionally with different beams. For example, the UE 702 may use beam n for transmitting a Msg 1 (e.g., 711) at a first time period (e.g., Time Period 1) and use beam m for transmitting another Msg 1 (e.g., 713) at a second time period (e.g., Time Period 2), etc. As shown by diagram 750 of FIG. 7B, the UE 702 may transmit multiple Msg 1 based on FDM, where the UE 702 may transmit multiple Msg 1 using same time resources but different frequency resources. For example, a first Msg1 transmission 715 and a second Msg1 transmission 717 may be overlap in time, but are transmitted using different frequency resources (e.g., using different frequency bands).

Although the example in FIG. 7A illustrates the reference signal as CSI-RS, aspects presented herein may apply to other types of reference signals, such as synchronization signals (e.g., SSBs) transmitted from a base station using different beams. Also, while the reference signals may be transmitted from a single TRP and the Msg 1 transmissions from a UE may be received at the single TRP, aspects presented herein may also be applied to multiple TRPs. In addition, although aspects in diagram 700 of FIG. 7A are described in connection with a PSCell 706, the UE 702 may similarly perform the random access procedure based on beam sweeping with a PCell 707 or an SCell. As described in connection with FIG. 5, the PCell 707 may provide random access configuration to the UE 702.

In some examples, a UE may transmit each of the multiple Msg 1 using a selected beam pair. For example, referring back to FIG. 7A, the UE 702 may transmit Msg 1 (e.g., 711) using a selected beam pair (e.g., the selected beam pair may include a transmitting beam of the UE and a reception beam of the base station), and the UE 702 may transmit another Msg 1 (e.g., 713) using a different beam pair. In other words, the UE may transmit a first Msg 1 (e.g., 711) using a transmitting beam corresponding to a CSI-RS beam n, and the UE may also transmit a second Msg 1 (e.g., 713) using a CSI-RS beam m, etc.

Figure 8:
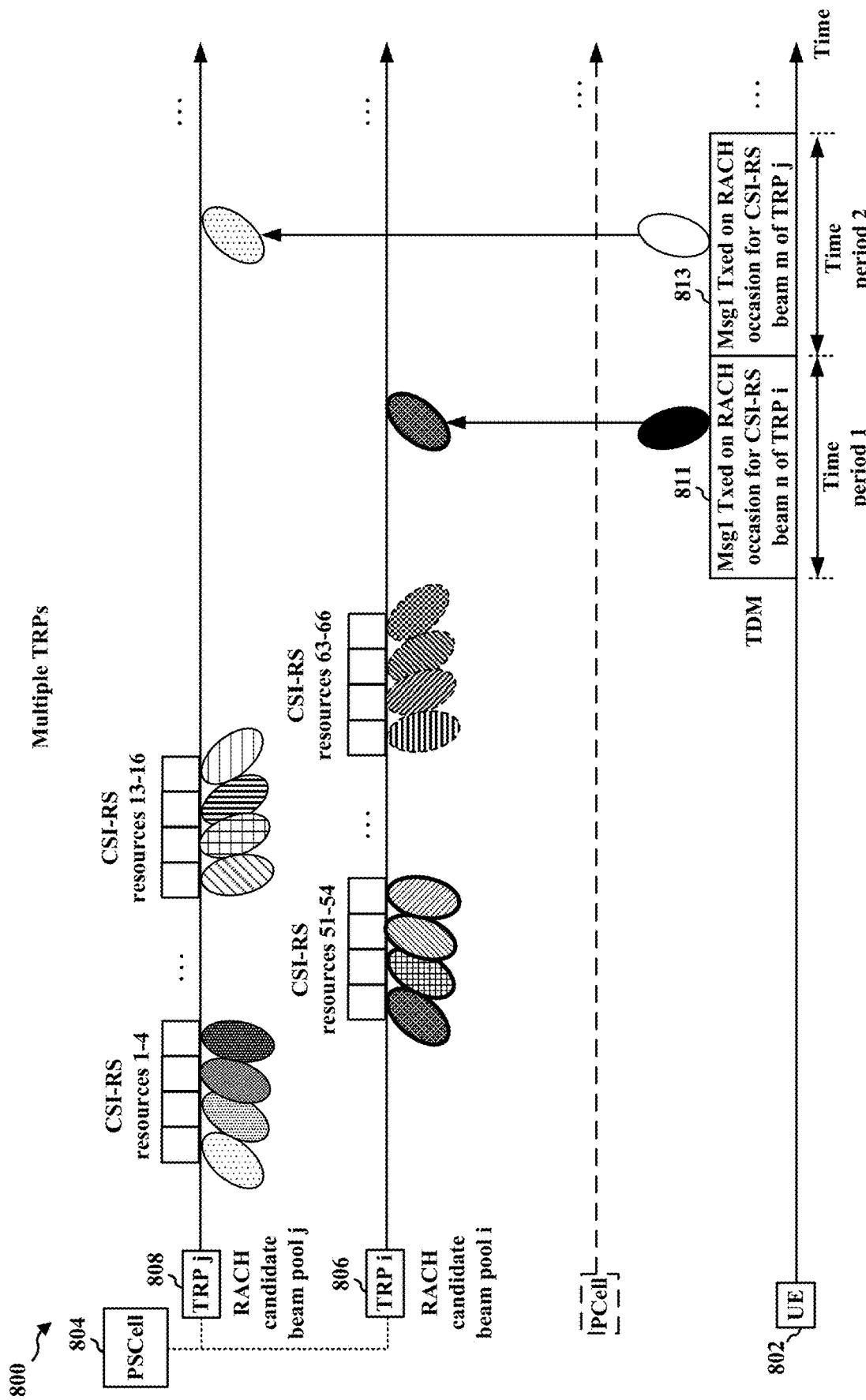
FIG. 8 illustrates example aspects of random access between a UE and a cell having multiple TRPs using multiple beams according to aspects of the present disclosure.

FIG. 8 is a diagram 800 illustrating an example of a RACH procedure involving multiple TRPs according to aspects of the present disclosure. Optional aspects are illustrated with a dashed line. A PSCell may include a first TRP 806 (e.g., TRP i) and a second TRP 808 (e.g., TRP j). The RACH procedure involving multiple TRPs may correspond to the RACH procedure 519 which is described in connection with FIG. 5, and the RACH procedure may include an exchange of messages as described in connection with FIG. 4. A RACH procedure involving multiple TRPs may include similar aspects to a RACH procedure involving a single TRP that is described in connection with FIGS. 7A and 7B. However, for the RACH procedure that involves multiple TRPs, a PSCell (e.g., 804) may transmit multiple reference signals (e.g., CSI-RS) through multiple TRPs to a UE, and the UE may transmit multiple Msg 1 to different TRPs of the PSCell.

For example, as shown by the diagram 800, the first TRP 806 may transmit multiple CSI-RS from different transmitting beams of the first TRP 806 using different CSI-RS resources (e.g., resources #51-54 and #63-66), e.g., the first TRP 806 may transmit a first CSI-RS using a first CSI-RS resource (e.g., resource #51) from a first beam of the first TRP 806, a second CSI-RS using a second CSI-RS resource (e.g., resource #52) from a second beam of the first TRP 806, a third CSI-RS using a third CSI-RS resource (e.g., resource #53) using a third beam of the first TRP 806, etc. In one example, beams used for transmitting the CSI-RS may be selected from a beam pool (e.g., a RACH candidate beam pool i) that is associated with the first TRP 806. Similarly, the second TRP 808 may also transmit multiple CSI-RS from different transmitting beams of the second TRPs using different CSI-RS resources (e.g., resources #1-4 and #13-16), e.g., the second TRP 808 may transmit a first CSI-RS using a first CSI-RS resource (e.g., resource #1) from a first beam of the second TRP 808, a second CSI-RS using a second CSI-RS resource (e.g., resource #2) from a second beam of the second TRP 808, a third CSI-RS using a third CSI-RS resource (e.g., resource #3) using a third beam of the second TRP 808, etc. Similarly, beams used for transmitting the CSI-RS may be selected from a beam pool (e.g., a RACH candidate beam pool j) that is associated with the second TRP 808. In some examples, a beam pool that is associated with one TRP of a PSCell may not overlap with a beam pool that is associated with another TRP of the PSCell. For examples, beams within the RACH candidate beam pool i that is associated with the first TRP 806 of the PSCell 804 may be configured not to overlap with beams within the RACH candidate beam pool j that is associated with the second TRP 808 of the PSCell 804.

Based on the CSI-RS transmitted from one or more beams of the first TRP 806 and CSI-RS transmitted from one or more beams the second TRP 808, a UE 802 may transmit multiple Msg 1 (e.g., a first random access message corresponding to 412 which may include a permeable) to one or more beams (e.g., reception beams) of the first TRP 806 and one or more beams of the second TRP 808. For example, the UE 802 may transmit a first Msg 1 (e.g., 811) to the first TRP 806, and the UE 802 may transmit a second Msg 1 (e.g., 813) to the second TRP 808.

In some examples, the receiving beams of the PSCell may be from different random access resource candidate beam pools of a serving cell, which may correspond to FDM or TDM random access resources. For example, as the second TRP 808 may be associated with the random access candidate beam pool j, such that the second TRP 808 may use reception beams that are selected from the random access candidate beam pool j for the random access. Similarly, as the first TRP 806 may be associated with the random access candidate beam pool i, the first TRP 806 may use reception beams that are selected from the random access candidate beam pool i for the random access procedure. In other examples, a single TRP may be associated with multiple beam pools, where different beam pools may be used for different random access resources. An index (e.g., a beam index) may be provided to the UE that is associated with reference signals transmitted from a cell or TRP(s) of the cell. Also, each TRP may be associated with a TRP index. Therefore, when a UE receives a reference signal during a RACH procedure from a cell or a TRP, the UE may determine a beam of the cell or the TRP and/or a beam pool associated with the cell or the TRP that correspond to the received reference signal based on the beam pool index and/or the TRP index. In some examples, a TRP may have up to sixty-four (64) beams, which may be separated/grouped into different beam pools for random access. For example, a first eight (8) beams of a TRP (e.g., TRP index=0) may be associated with a first beam pool index (e.g., pool index #1), the next eight beams of the TRP may be associated with a second beam pool index (e.g., pool index #2), and so forth with the final eight beams of the TRP being associated with an eighth beam pool index (e.g., pool index #8). In such example, a UE may select a beam within a beam pool index for transmitting a Msg 1. By configuring/assigning beam pool index for beams of a single TRP or multiple TRPs, beam pairing misalignment between a UE and the TRP(s) may be avoided.

Figure 9:
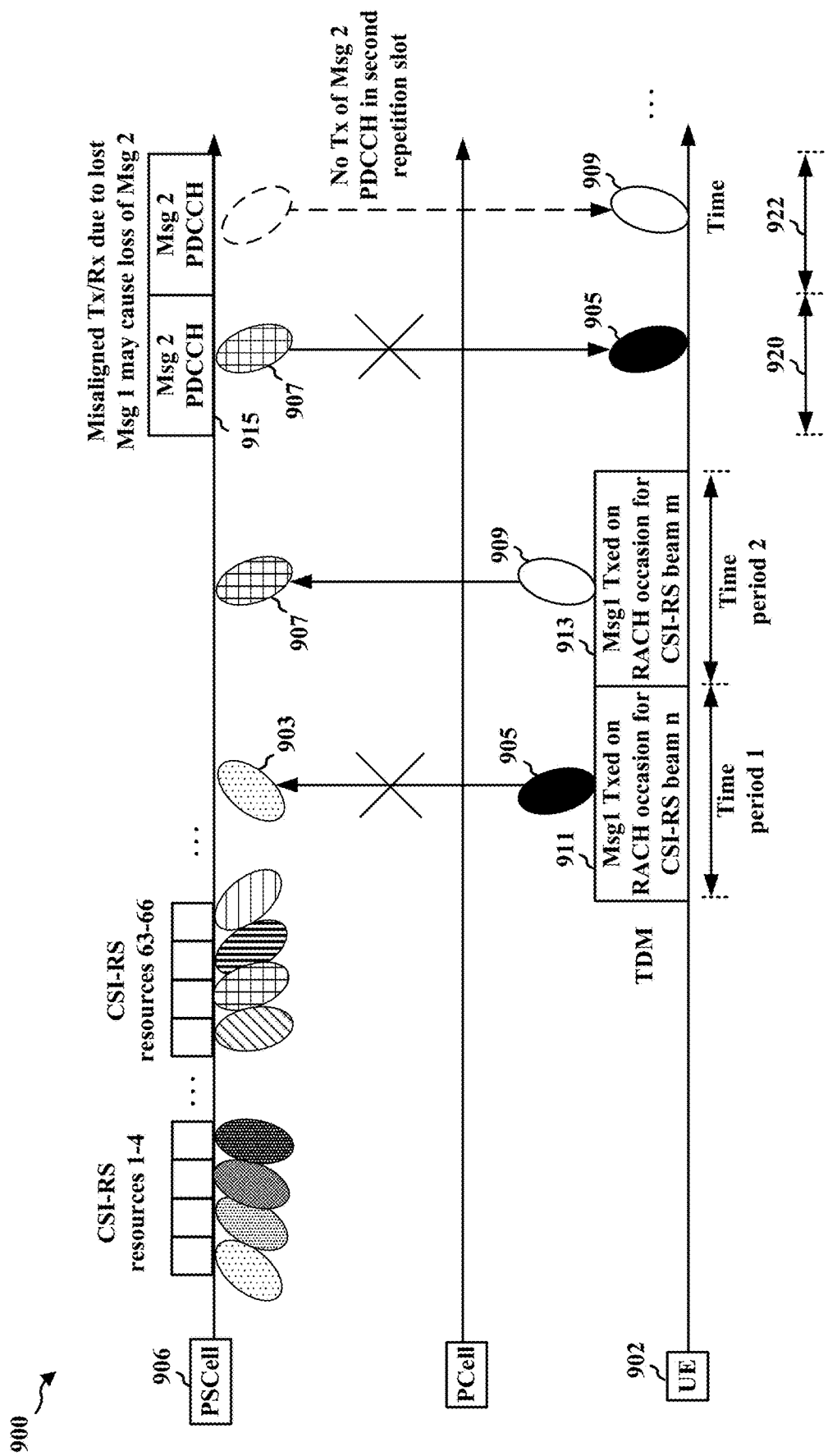
FIG. 9 illustrates example aspects of random access between a UE and a cell having a single TRP using multiple beams according to aspects of the present disclosure.

FIG. 9 is a diagram 900 illustrating an example of a beam pairing misalignment which may occur during a RACH procedure involving beam sweeping. The RACH procedure may include aspects described in connection with any of the examples in FIGS. 7A, 7B, and 8. In one example, after a PSCell 906 transmits multiple CSI-RS from multiple beams of the PSCell 906, a UE 902 may transmit multiple Msg 1 to one or more beams of the PSCell 906 based at least in part on the CSI-RS. For example, the UE 902 may transmit a first Msg 1 (e.g., 911) to a beam 903 of the PSCell 906 using a first UE beam 905, and the UE 902 may transmit a second Msg 1 (e.g., 913) to a beam 905 of the PSCell 906 using a second UE beam 909. However, the PSCell 906 may receive the second Msg 1 (e.g., 913) at the beam 907, but may not receive the first Msg 1 (e.g., 911) at the beam 903. As the first Msg 1 (e.g., 911) may not be received by the PSCell 906, the PSCell 906 may transmit a Msg 2 PDCCH 915 using the beam or the beam pair (e.g., the beam 907) corresponding to the reception of the second Msg 1 (e.g., 913) during the RACH procedure. However, as shown at 920, the UE 902 may be monitoring for a Msg 2 PDCCH (e.g., for the first Msg 1) using the beam 905 (i.e., the beam used for transmitting the first Msg 1). This may result in a beam pairing misalignment as the UE 902 may be expecting to receive the Msg 2 PDCCH 915 from the beam 903 of the PSCell 906 but the PSCell is transmitting the Msg 2 PDCCH 915 using the beam 907. Then, at 922, the UE 902 may be monitoring for a Msg 2 PDCCH (e.g., for the second Msg 1) using the beam 909 (i.e., the beam used for transmitting the second Msg 1). However, as the PSCell 906 receives one Msg 1 (e.g., 913) from the UE 902, the PSCell 906 may transmit one Msg 2 PDCCH at 920, and may not transmit another Msg 2 PDCCH at 922. Thus, the UE 902 may not receive another Msg 2 PDCCH at 922. As such, the unsuccessful transmission of the first Msg 1 (e.g., 911) may lead to a misalignment between the beam used by the PSCell 906 for transmitting the Msg 2 PDCCH and the beam used by the UE 902 for receiving the Msg 2 PDCCH 915.

Figure 10:
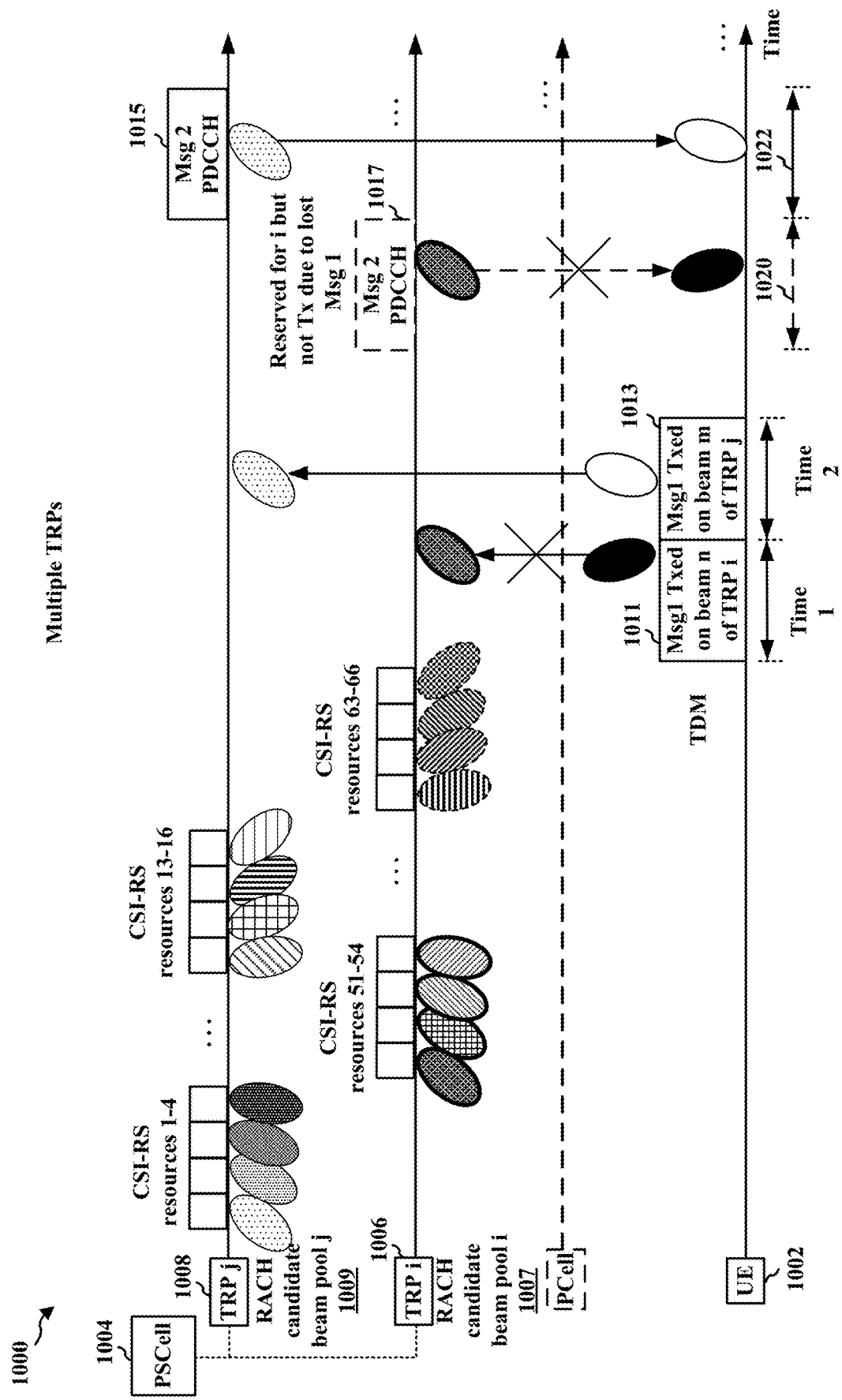
FIG. 10 illustrates example aspects of random access between a UE and a cell having multiple TRPs using multiple beams according to aspects of the present disclosure.

FIG. 10 is a diagram 1000 illustrating an example of using beam pool index to avoid beam pairing misalignment according to aspects of the present disclosure. Optional aspects are illustrated with a dashed line. A UE 1002 may initiate a RACH procedure through a first TRP 1006 and a second TRP 1008 of a PSCell 1004, where the first TRP 1006 may be associated with a first RACH candidate beam pool (e.g., a beam pool i) and a first TRP index (e.g., TRP index=0) and the second TRP 1006 may be associated with a second RACH candidate beam pool (e.g., a beam pool j) a second TRP index (e.g., TRP index=1). The RACH procedure may include aspects described in connection with any of the example in FIGS. 7A-9. In one example, the UE 1002 may transmit a first Msg 1 (e.g., 1011) to the first TRP 1006 and a second Msg 1 (e.g., 1013) to the second TRP 1008. The first Msg 1 from the UE 1002 may not be received by the first TRP 1006, while the second Msg 1 may be received by the second TRP 1008. As the first Msg 1 is not received by the first TRP 1006, the PSCell 1004 may not send a Msg 2 PDCCH in response to the first Msg 1. However, as shown at 1020, a random access resource, e.g., a resource selected from the first RACH candidate beam pool (e.g., the beam pool i), may be reserved by the PSCell 1004 for transmitting a Msg 2 PDCCH 1017 from the first TRP 1006 to the UE 1002 in response to the first Msg 1 (e.g., 1011). Thus, the PSCell 1004 may skip sending the Msg 2 PDCCH 1017 from the first TRP 1006 as the random access resource is reserved. Then, as shown at 1022, the PSCell 1004 may transmit a Msg 2 PDCCH 1015 from the second TRP 1008 using a beam selected from the second RACH candidate beam pool (e.g., the beam pool j) in response to the second Msg 1 (e.g., 1013), where the UE 1002 may be monitoring for the Msg 2 PDCCH 1015 using the beam that transmitted the second Msg 1. Therefore, the beam pair used by the UE 1002 for receiving the Msg 2 PDCCH 1015 may align with the beam pair used by the UE for transmitting the second Msg 1, such that the UE 1002 may receive the Msg 2 PDCCH 1015 using the beam that transmitted the second Msg 1.

Aspects presented herein may enable a UE to transmit multiple Msg 3 and/or enable a cell or TRP(s) of a cell to transmit multiple Msg 4 with beam sweeping to improve reliability and robustness of the random access communication. For example, a UE may transmit multiple Msg 3 RRC connection requests to a cell or one or more TRPs of a cell with beam sweeping and based on TDM, SDM, FDM, or a combination thereof. The UE may transmit the multiple Msg 3 using uplink resources granted in a Msg 2 by the cell, such as illustrated in connection with FIGS. 9-11. In some examples, the cell may include information related to beam sweeping, such as beam(s) used by the cell and/or each TRP for transmitting random access messages, in each of the Msg 2 transmitted. Thus, as long as one of the Msg 2 is successfully received by the UE, the UE may apply beam sweeping to the multiple Msg 3 transmissions based at least in part on the beam sweeping information received. Similarly, the cell may transmit multiple Msg 4 based on beam sweeping in response to the Msg 3 received from the UE.

Figure 11A:
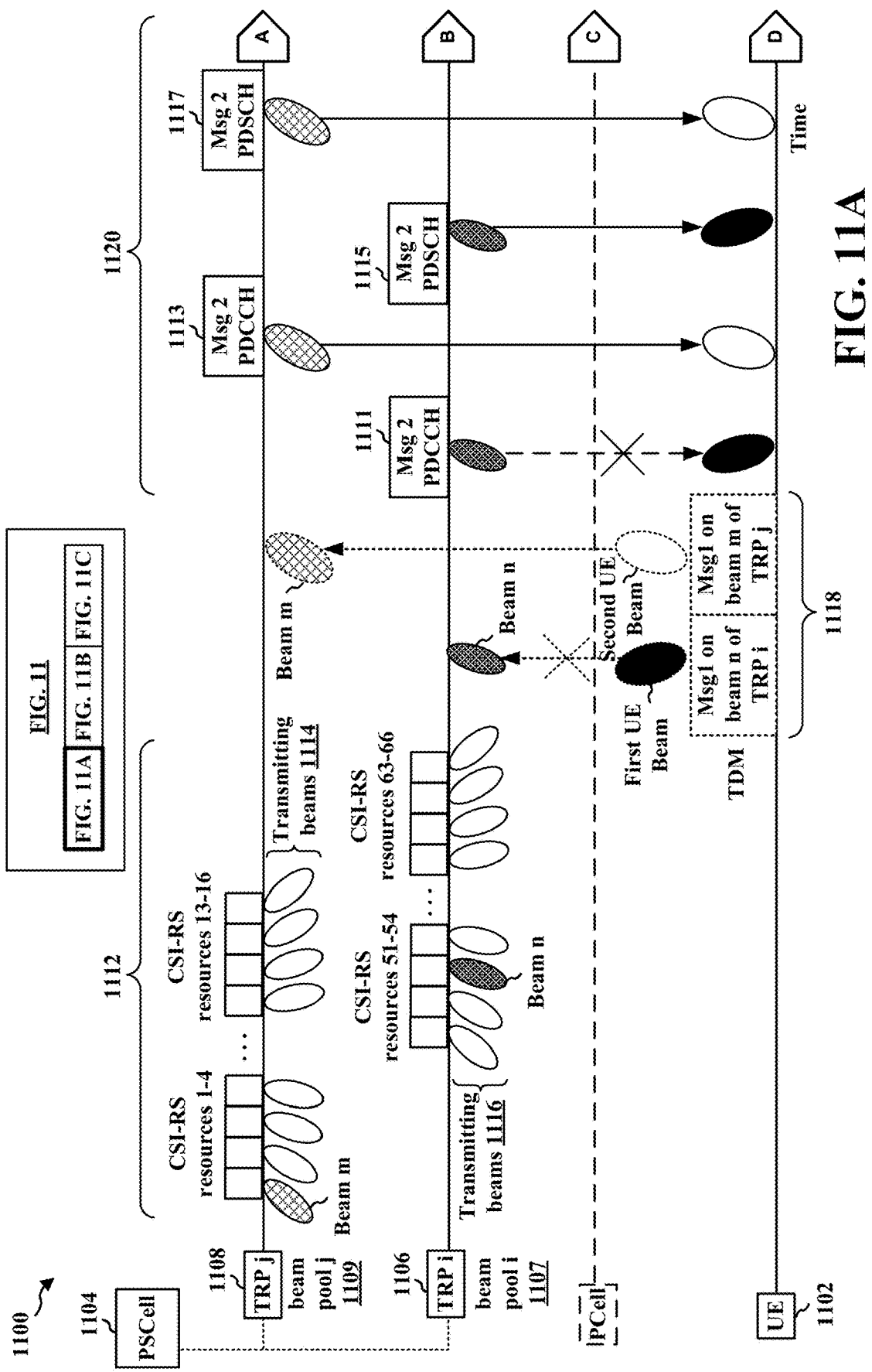
FIGS. 11A, 11B and 11C illustrate example aspects of random access between a UE and a cell having multiple TRPs using multiple beams according to aspects of the present disclosure.
Figure 11B:
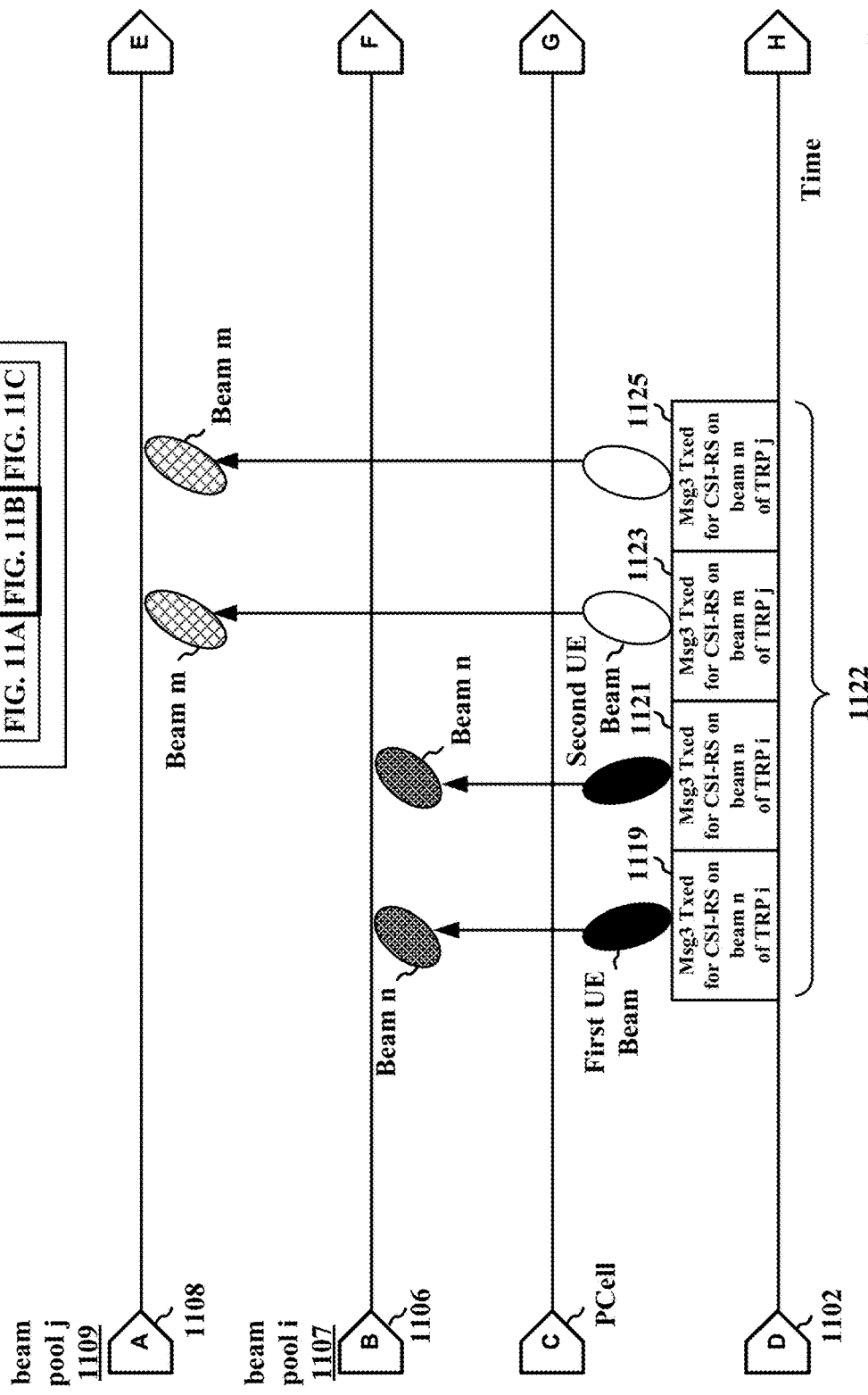
Figure 11C:
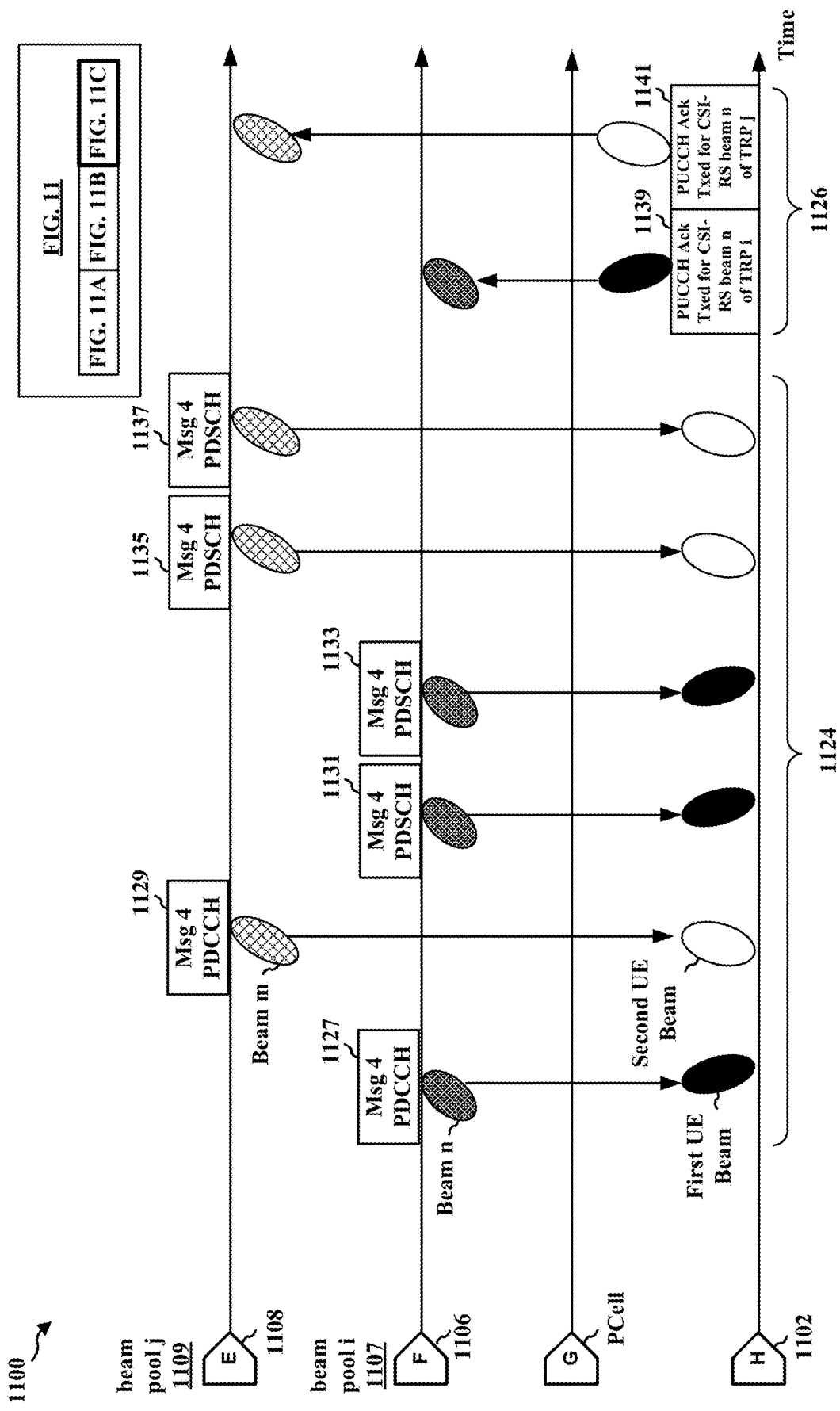

FIG. 11, formed by FIGS. 11A, 11B and 11C, is a diagram 1100 illustrating an example of a RACH procedure involving transmitting multiple Msg 3 (e.g., from a UE) and multiple Msg 4 (from multiple TRPs of a cell) according to aspects of the present disclosure. The RACH procedure described herein may include aspects described in connection with any of the examples in FIGS. 7A-10, and may include joint random access message transmissions that may improve reliability and robustness of random access communication.

As shown at 1112, a UE 1102 may initiate a RACH procedure with a first TRP 1106 and a second TRP 1108 of a PSCell 1104, where the first TRP 1106 may be associated with a first RACH candidate beam pool 1007 (e.g., a beam pool i) and a first TRP index (e.g., TRP index=0), and the second TRP 1108 may be associated with a second RACH candidate beam pool 1009 (e.g., a beam pool j) and a second TRP index (e.g., TRP index=1). The RACH procedure may include aspects described in connection with any of the example in FIGS. 7A-10.

As described in connection with FIG. 8, each TRP may transmit one or more reference signals from one or more beams of the TRP, where one reference signal may correspond to one beam of the TRP. For example, as shown at 1112, the first TRP 1106 may transmit multiple CSI-RS from one or more beams 1116 of the first TRP 1106 using different CSI-RS resources (e.g., resources #51-54 and #63-66), where the one or more beams 1116 may be selected from the first RACH candidate beam pool 1007. Similarly, the second TRP 1108 may transmit multiple CSI-RS from one or more beams 1114 of the second TRP 1108 using different CSI-RS resources (e.g., resources #1-4 and #13-16), where the one or more beams 1114 may be selected from the second RACH candidate beam pool 1009. In some examples, candidate beams in the first RACH candidate beam pool 1007 may be configured not overlap with candidate beams in the second RACH candidate beam pool 1009.

At 1118, after the UE 1102 receives one or more CSI-RS transmitted from the first TRP 1106 and/or the second TRP 1108, the UE may transmit multiple Msg 1 to the first TRP 1106 and/or the second TRP 1108 based on beam sweeping, such as described in connection with FIGS. 8 to 10. The UE 1102 may determine which beam(s) is used by a TRP for transmitting CSI-RS and/or which TRP transmits the CSI-RS based on the pool index and/or the TRP index associated with the TRP. In one example, the UE 1102 may transmit a first Msg 1 using a first UE beam to a beam n of the first TRP 1106, and the UE 1102 may transmit a second Msg 1 using a second UE beam to a beam m of the second TRP 1108, etc. Each of the Msg 1 may include information related to beams used by the UE 1102 (e.g., the first UE beam and the second UE beam) for transmitting Msg 1. Thus, as long as one Msg 1 is successfully received by the PSCell 1104 or one of the TRPs of the PSCell 1104, the PSCell 1104 may know the beam pairs used by the UE 1102 for transmitting Msg 1 (e.g., first UE beam pairs with beam n of the first TRP, second UE beam pairs with beam m of the second TRP, etc.). For example, if the first Msg 1 from the UE 1102 is not received by the first TRP 1106 but the second Msg 1 is received by the second TRP 1108, the PSCell 1104 may still know the beam pairs used by the UE 1102, and the PSCell 1104 may transmit multiple Msg 2 PDCCH/PDSCH to the UE 1102 based on the beam pair to avoid beam pair misalignment. Although the example in FIG. 11A shows the UE 1102 transmitting a Msg 1 to one beam of each TRP, the UE 1102 may also transmit multiple Msg 1 to multiple reception beams of a TRP using different UE beams, such as described in connection with FIG. 7A.

After the PSCell 1104 receives a Msg 1 from the UE 1102, such as at beam m of the second TRP 1108, the PSCell 1104 may respond multiple Msg 2 to the UE 1102 based on beam sweeping. For example, as shown at 1120 of FIG. 11A, the PSCell 1104 may transmit a Msg 2 PDCCH 1111 and a Msg 2 PDSCH 1115 to the first UE beam from beam n of the first TRP 1106, and the PSCell 1104 may transmit a Msg 2 PDCCH 1113 and a Msg 2 PDSCH 1117 to the second UE beam from beam m of the second TRP 1108. In some examples, the PSCell 1104 may communicate with the UE 1102 using a single TRP, e.g., as illustrated in FIGS. 7A and 9, or the PSCell 1104 may communicate with the UE using multiple TRPs, as illustrated in FIGS. 10 and 11. Although FIGS. 9-11 illustrate the beam sweeping and/or transmission of random access messages based on TDM, the random access messages may be beam swept using TDM, SDM, FDM or a combination thereof. Also, the Msg 2 PDSCHs (e.g., 1115, 1117) may be transmitted using beams corresponding to the Msg 2 PDCCH scheduling the PDSCH. For example, the beam used by the first TRP 1106 for transmitting the Msg 2 PDSCH 1115 may be the same as the beam used by the first TRP for transmitting the Msg 2 PDCCH 1111 that schedules the Msg 2 PDSCH 1115 (e.g., both use the beam n). In another example, a Msg 2 PDSCH may be transmitted using a different beam than the Msg 2 PDSCH that schedules the Msg 2 PDSCH.

A Msg 2 PDCCH may carry resource allocation information and/or beam sweeping related information for multiple Msg 2 PDSCHs. Thus, if one of the Msg 2 PDCCHs is not received, the UE may still receive the Msg 2 PDSCH(s), because the UE 1102 may be able to determine the corresponding resources from a different Msg 2 PDCCH. For example, referring back to FIG. 11A, if the Msg 2 PDCCH 1111 from the first TRP 1106 is not be received by the UE 1102 and the Msg 2 PDCCH 1113 from the second TRP 1108 is received by the UE 1102, the UE 1102 may still be able to receive both the Msg 2 PDSCH 1113 and the Msg 2 PDSCH 1117 from the first TRP 1106 and the second TRP 1108 receptively, because resource allocation information for multiple Msg 2 PDSCHs 1115 and 1117 may be included in each of the Msg 2 PDCCHs 1111 and 1113. Thus, as long as one Msg 2 PDCCH (e.g., the Msg 2 PDCCH 1113) is received by the UE 1002, the UE 1002 may receive complete resource allocation information for scheduled PDSCHs successfully.

In another aspect of the present disclosure, a Msg 2, such as a Msg 2 PDSCH (e.g., 1113 and 1117), transmitted to a UE may carry an uplink grant that includes beam related information, such as a beam sweep pattern and/or a beam configuration, which may be used by the UE for transmitting multiple Msg 3 based on beam sweeping. Thus, after the UE receives at least one Msg 2 PDSCH from a TRP or a cell, the UE may use the uplink resources granted in the Msg 2 to transmit multiple Msg 3 with beam sweeping based at least in part on the beam related information received in the uplink grant.

For example, referring back to FIG. 11A, the UE 1102 may receive the Msg 2 PDSCH 1115 from the first TRP 1106, but may not receive the Msg 2 PDSCH 1117 transmitted from the second TRP 1108. Then, as shown by FIG. 11B, based on the received Msg 2 PDSCH 1115, the UE 1102 may transmit multiple Msg 3 PUSCHs, such as PUSCHs 1119, 1121, 1123, 1125, with beam sweeping to the first TRP 1106 and the second TRP 1108 as the Msg 2 PDSCH 1115 may include uplink resources and full beam sweep information (e.g., beams used by the TRP for transmission/reception RACH messages) in which the UE 1102 may use for transmitting the multiple Msg 3 PUSCHs. Thus, as long as the UE 1102 receives one of multiple Msg 2 PDSCHs from a TRP (e.g., 1106, 1108), the UE 1102 may know the beam(s) and/or beam pair(s) used by the cell or TRP(s) of the cell for transmitting/receiving RACH messages, and the UE 1102 may transmit multiple Msg 3 with beam sweeping to the beam(s) and/or beam pair(s) used by the cell or TRP(s) of the cell. The UE 1102 may transmit multiple Msg 3 to the first TRP 1006 and/or the second TRP 1008 based on TDM, SDM, FDM and/or a combination thereof. For example, as shown at 1122 of FIG. 11B, the UE 1102 may use a first UE beam to transmit a first Msg 3 PUSCH 1119 and a second Msg 3 PUSCH 1121 to beam n of the first TRP 1106, and then the UE 1102 may use a second UE beam to transmit a third Msg 3 PUSCH 1123 and a fourth Msg 3 PUSCH 1125 to beam m of the second TRP 1108, where the beam sweeping transmissions of Msg 3 PUSCHs are based on TDM (e.g., each Msg 3 may be transmitted at a different time). In some examples, the UE 1102 may select resources for transmitting Msg 3 based on at least one of a beam pool index or a TRP index, such as described in connection with RACH candidate beam pool in FIGS. 10 and 11A.

In one example, if a UE transmits multiple Msg 1 based on beam sweeping, the UE may use the same beam sweep pattern for transmitting Msg 3 PUSCHs, or it may use a different beam sweep pattern/set depending on the beam sweep information the UE receives in the uplink grant of Msg 2. For example, as shown at 1118 of FIG. 11A, if the UE 1102 transmits the first Msg 1 using the first UE beam to beam n of the first TRP 1106 and transmits the second Msg 2 using the second UE beam to beam m of the second TRP 1108, then the UE 1102 may use the same beam pair(s) and/or transmission beam(s) (e.g., the first UE beam and the second UE beam) for transmitting the multiple Msg 3 PUSCH, such as shown at 1122 of FIG. 11B.

In some examples, a base station (e.g., the cell 1104) may include an indication in the beam sweep information (e.g., in the Msg 2 PDSCH) to indicate/notify a UE to apply whether to apply a same beam sweep configuration or to apply a different beam sweeping configuration(s) to improve the wireless transmission. For example, if a base station (e.g., 706, 806, 808, 906) or a TRP (e.g., 1006, 1008, 1106, 1108) determines that the received signal strength is low or below a threshold for the Msg 1, the base station may enable beam repetition for UE in the uplink grant of Msg 2 to improve the transmission reliability for Msg 3. For example, referring back to 1118 of FIG. 11A, if the second TRP 1108 determines that the received signal strength for the Msg 1 transmitted from the second UE beam is below a threshold, the PSCell 1104 may indicate to the UE 1102 to apply beam repetition for Msg 3 PUSCH transmissions. Then, as shown by FIG. 11B, the UE 1102 may send multiple Msg 3 PUSCHs (e.g., 1119 and 1121) from the first UE beam, multiple Msg 3 PUSCHs (e.g., 1123 and 1125) from the second UE beam and so on for one or more transmission beams of the UE based at least in part on the beam sweep information, where Msg 3 PUSCH 1121 may be a repetition of the Msg 3 PUSCH 1119, and the Msg 3 PUSCH 1125 may be a repetition of the Msg 3 PUSCH 1123, etc.

In another example, as the environment or the channel condition between a UE and a base station may change over time, if the base station (e.g., SCell 706, 806, 808, 906) or a TRP (e.g., 1006, 1008, 1106, 1108) receives a more recent beam measurement report, such as a Layer 1 (L1) and/or a Layer 3 (L3) measurement report, that indicates one or more beams having a better beam measurement than those used by the UE (e.g., 702, 802, 902, 1002, 1102) for transmitting the Msg 1, the base station may indicate (e.g., through beam sweep information in the uplink grant of Msg 2 PDSCH) to the UE to change one or more sweeping (e.g., transmission) beams for transmitting the Msg 3 PUSCH. For example, referring back to FIGS. 11A and 11B, if the PSCell 1004 receives a beam measurement report indicating that a third UE beam and a fourth UE beam of the UE 1002 have better beam measurement than the first UE beam and the second UE beam of the UE 1002, the PSCell 1004 may indicate to the UE 1002 to use the third UE beam and the fourth UE beam for transmitting Msg 3 PUSCHs instead. In some examples, the base station may also choose new beam(s) that have better L1 and/or L3 measurement(s) or it may choose beam(s) within the L1 and/or L3 measurement(s) that are above a threshold.

In another example, if a base station (e.g., SCell 706, 806, 808, 906) or a TRP (e.g., 1006, 1008, 1106, 1108) determines that the received signal strength for one or more beams of the UE is low or below a threshold (e.g., based on measuring the Msg 1 received), the base station may indicate to the UE in the uplink grant (e.g., the Msg 2 PDSCH) to increase beams used for transmitting the Msg 3 PUSCH and/or to replace one or more beam(s) used for transmitting the Msg 1 with other beam(s) for transmitting the Msg 3 PUSCH to improve transmission reliability. For example, if a UE (e.g., the UE 1102) uses a first UE beam and a second UE beam for transmitting the Msg 1 and a serving base station (e.g., the PSCell 1104) determines that the signal strength for the first UE beam is below a threshold, the base station may indicate to the UE to use additional beams for transmitting the Msg 3 PUSCH, such as using the first UE beam, the second UE beam, the third UE beam and the fourth UE beam for transmitting the Msg 3 PUSCH, or the base station may indicate to the UE to replace the first UE beam with a third UE beam for transmitting the Msg 3 PUSCH, such that the UE may use the second UE beam and the third UE beam for transmitting the Msg 3 PUSCH.

As described above, a wireless device (e.g., a base station, a TRP, a UE, etc.) may transmit random access messages with beam sweeping based on TDM, SDM, FDM or a combination thereof. In one example, a base station may use an uplink grant to indicate to a UE which multiplexing scheme may be used by the UE for transmitting Msg 3 PUSCH, and the base station may optionally indicate a number of repetitions for a transmission based on the indication multiplexing scheme. For example, a UE may be configured by a base station in the uplink grant with a scheme selection indicator set to one of "FDM scheme," "TDM Scheme," "SDM Scheme," and/or number of repetitions for transmission(s) in each scheme may also be indicated to the UE (e.g. two repetitions, four repetitions etc.). For instance, when two repetitions are indicated in an uplink grant, and the UE is configured to apply an FDM Scheme, the base station may monitor two PUSCH transmission occasions which have non-overlapping frequency domain resource allocations. Thus, the UE may transmit the Msg 3 in the two PUSCH transmission occasions having non-overlapping frequency resources. Similarly, when two repetitions are indicated in an uplink grant and the UE is using a TDM Scheme, the base station may monitor two PUSCH transmission occasions which have non-overlapping time domain resource allocations. Thus, the UE may transmit the Msg 3 in the two PUSCH transmission occasions having non-overlapping time resources. In another example, when two repetitions are indicated in the uplink grant and the UE is using an SDM Scheme, the base station may monitor two PUSCH transmission occasions having two spatial separated beam resource allocations (e.g., two downlink reference signal IDs). Thus, the UE may transmit the Msg 3 in the two different beams. In addition, the UE may also be configured by a base station to use more than one multiplexing scheme or to use a combination of schemes. For example, the UE may use SDM in connection with FDM scheme and/or TDM scheme.

In some examples, the RACH setup procedure (e.g., random access message exchange) between a PSCell (e.g., 706, 806, 808, 906) and a UE (e.g., 702, 802, 902, 1002) described in connection with FIGS. 4 to 11 may be contention free, such as when the PSCell is under non-standalone (NSA) mode in certain network settings. For example, referring back to FIG. 5, as the PCell 504 may be connected to the UE 502, the PCell 504 may allocate reference signal resources (e.g., 513), RACH resources (e.g., 511) etc. for the PSCell 506, and the PCell 504 may also pass UE information (e.g., UE ID) to the PSCell 506. Thus, the PSCell 506 may skip performing a contention resolution procedure as the PSCell 506 may have information about the UE 502 (e.g., UE ID). As such, if the contention resolution procedure may be skipped, the PSCell 506 may continue or complete the RACH setup procedure with the UE 502 without sending a contention resolution message (e.g., Msg 4) to the UE 502.

In other examples, the RACH setup procedure (e.g., random access message exchange) between a PSCell (e.g., 706, 806, 808, 906) and a UE (e.g., 702, 802, 902, 1002, 1102) may not be contention free, such as when the PSCell is under standalone (SA) mode in certain network settings. In such cases, the PSCell may perform contention resolution by transmitting a contention resolution message (e.g., Msg 4) to the UE to complete the RACH setup procedure.

In another aspect of the present disclosure, a cell or one or more TRPs of a cell may be configured to transmit multiple Msg 4 PDCCHs/PDSCHs to a UE based on beam sweeping, where the transmission of the multiple Msg 4 PDCCHs/PDSCHs may be based on TDM, FDM, SDM or a combination thereof. Similarly, beams used by the cell or one or more TRPs for transmitting the multiple Msg 4 PDCCHs/PDSCHs may be selected from one or more beam pool indexes, such as illustrated in connection FIGS. 9-11. Thus, as long as one Msg 4 is received by the UE, the RACH setup procedure between the with the UE and the cell may be completed.

For example, as illustrated by FIG. 11C, the PSCell 1004 may configure multiple Msg 4 PDCCHs/PDSCHs to be transmitted to the UE 1102 from one or more beams of the first TRP 1006 and one or more beams of the second TRP 1008 based on TDM. While the example in FIG. 11C applies TDM for the multiple Msg 4 transmissions, the transmissions of the multiple Msg 4 PDCCHs/PDSCHs may also be based on FDM TDM, SDM or a combination thereof. The one or more beams used by the first TRP 1106 and/or the second TRP may be selected from their corresponding beam pool, such as the beam pool 1007 and the beam pool 1109 respectively.

In one example, the first TRP 1106 and/or the second TRP 1108 may apply the same beam sweep pattern(s) (e.g., e.g. beam size, number of beam sweeps/repetition, etc.) and/or configuration(s) that are used for transmitting Msg 2 PDCCHs/PDSCHs (e.g., 1111, 1113, 1115, 1117). For example, as shown at 1120 of FIG. 11A, the first TRP 1106 may use beam n to transmit the Msg 2 PDCCH 1111 and the Msg 2 PDSCH 1115 to the first UE beam of the UE 1002, and the second TRP 1108 may use beam m to transmit the Msg 2 PDCCH 1113 and the Msg 2 PDSCH 1117 to the second UE beam of the UE 1002. Then, as shown at 1124 of FIG. 11C, the PSCell 1004 may also configure a Msg 4 PDCCH 1127, a Msg 4 PDSCH 1131, and a Msg 4 PDSCH repetition 1133 (e.g., repetition of the Msg 4 PDSCH 1131) to be transmitted from beam n of the first TRP 1106 to the first UE beam of the UE 1102, and the PSCell 1004 may configure a Msg 4 PDCCH 1129, a Msg 4 PDSCH 1135, a Msg 4 PDSCH repetition 1137 (e.g., repetition of the Msg 4 PDSCH 1135) to be transmitted from beam m of the second TRP 1108 to the second UE beam of the UE 1102.

In another example, the first TRP 1106 and/or the second TRP 1108 may apply a beam sweep pattern (e.g., e.g. narrower beams or different number of beam sweeps/repetition) and/or a beam configuration that is different from the beam sweep pattern and/or the beam configuration used for transmitting the Msg 2 PDCCHs/PDSCHs (e.g., 1111, 1113, 1115, 1117), and the PSCell 1004 may indicate the beam sweep pattern and/or the beam configuration in which the UE 1002 may use for receiving the Msg 4 via Msg 2 PDCCH and/or Msg 4 PDCCH. Alternatively, the TRP 1106 and/or the TRP 1108 may be configured (e.g., through Msg 2 PDCCH or Msg 4 PDCCH) to use different beam(s), beam patterns (e.g. narrower beams) and/or beam configurations (e.g., different number of beam sweeps/repetition).

If the UE 1102 receives at least one of the Msg 4 PDCCHs/PDSCHs from at least one of the TRPs (e.g., 1106, 1108) and the contention resolution is successful, a temporary cell radio network temporary identifier (TC-RNTI) associated with the UE 1102 may become an allocated C-RNTI. For example, a TC-RNTI may be used during a RACH procedure, where a base station's MAC layer may generate an RAR as a response to a random access preamble transmitted by a UE. The MAC RAR may contain a TC-RNTI. During contention based RACH procedure, the UE may store a received TC-RNTI (e.g., received in RAR) and uses the TC-RNTI during the RACH procedure (e.g., as an identifier). The UE may use the TC-RNTI for scrambling of msg3 (PUSCH corresponding to RAR grant) and its retransmissions. During contention based RACH procedure, the UE may also monitor PDCCH scrambled with Temp C-RNTI. The TC-RNTI may be promoted to C-RNTI for the UE that detects random access success and does not already have a C-RNTI.

After the UE 1102 receives at least one of the Msg 4 PDCCHs/PDSCH, the UE 1102 may transmit a HARQ feedback (e.g., ACK/NACK) to the PSCell 1004 to complete the RACH procedure, such as via a PUCCH. Similarly, the transmission of the HARQ feedback may be based on beam sweeping using TDM, FDM, SDM or a combination thereof. The UE 1102 may be configured by the PSCell 1004 via the Msg 2 PDCCH/PDSCH and/or the Msg 4 PDCCH on how to perform the beam sweeping for the HARQ-ACK feedback transmission. For example, the UE 1102 may be configured by the PSCell 1004 to use particular beam(s), beam pattern, and/or one or more beam configurations for transmitting the HARQ feedback. For example, the PSCell may indicate to the UE 1102 to use same beams and/or a beam pattern for transmitting Msg 3 PUSCHs to transmit the HARQ feedback. As shown at 1126 of FIG. 11C, the UE 1102 may transmit a first HARQ feedback 1139 from the first UE beam to beam n of the first TRP 1106, and the UE 1102 may transmit a second HARQ feedback 1141 from the second UE beam to beam m of the second TRP 1108, etc. Thus, as long as the PSCell 1104 receives one of the HARQ feedbacks transmitted by the UE 1102, the RACH procedure may be completed.

By transmitting one or more random access messages of a RACH procedure between a UE and a base station based on beam sweeping, such as described in connection with FIGS. 7 to 11, as long as one of each random access messages (e.g., Msg 1, Msg 2, Msg 3, Msg 4, etc.) is successfully received by the UE or the base station (e.g., depending on the random access message), the RACH setup procedure may be completed between the base station and the UE even if a subset of beams fails. As such, the robustness and reliability of the network transmission may be improved. For example, if a random access message transmitted/received in one beam is unsuccessful, the UE or the cell may continue with the RACH procedure because the random access message may be successfully transmitted/received in a different beam. Therefore, the application of beam sweeping for random access Msg 3 and/or Msg 4 may improve the latency for a transmission especially in low quality channel cases.

Figure 12A:
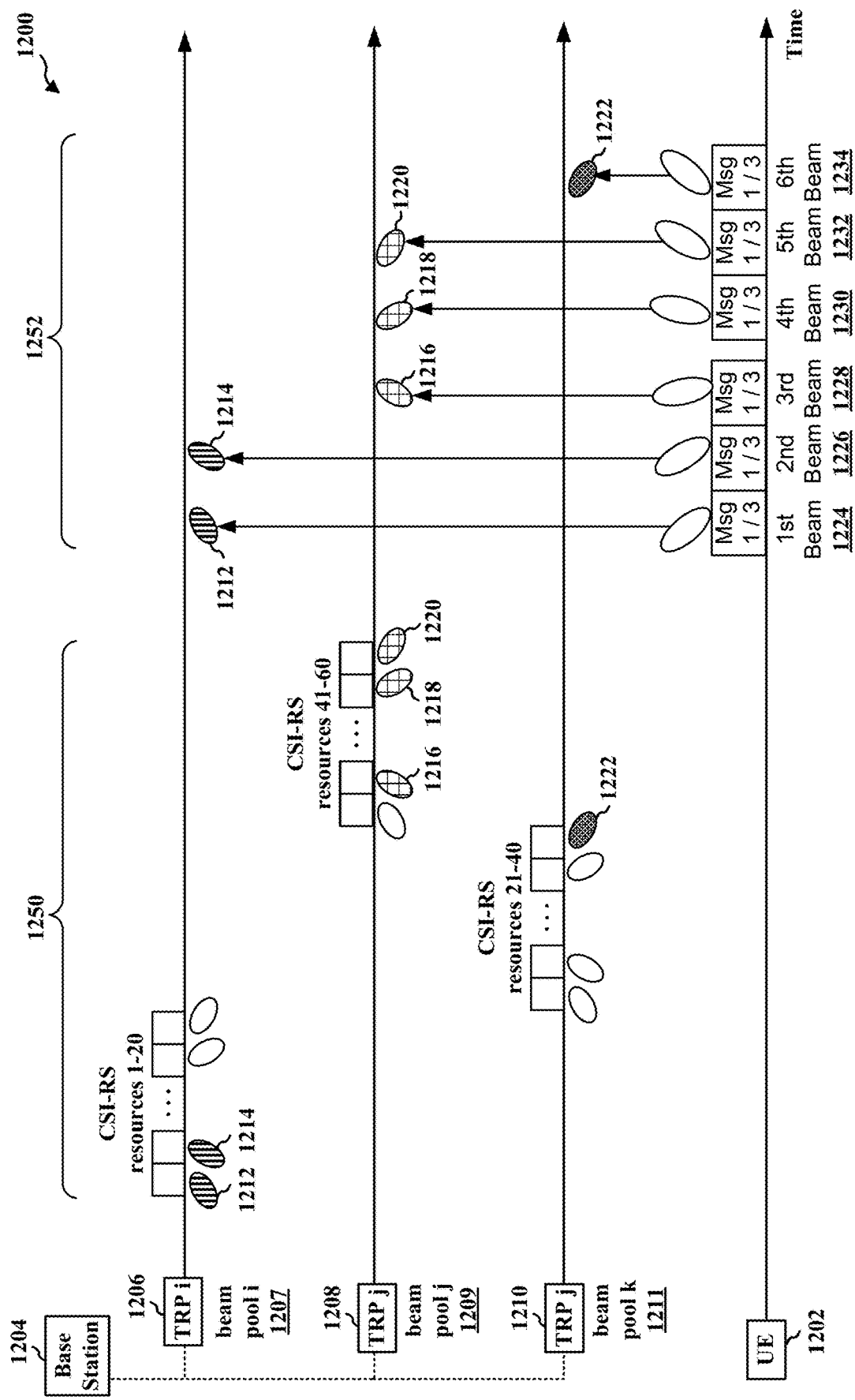
FIGS. 12A and 12B illustrate example aspects of random access between a UE and a cell having multiple TRPs using multiple beams according to aspects of the present disclosure.
Figure 12B:
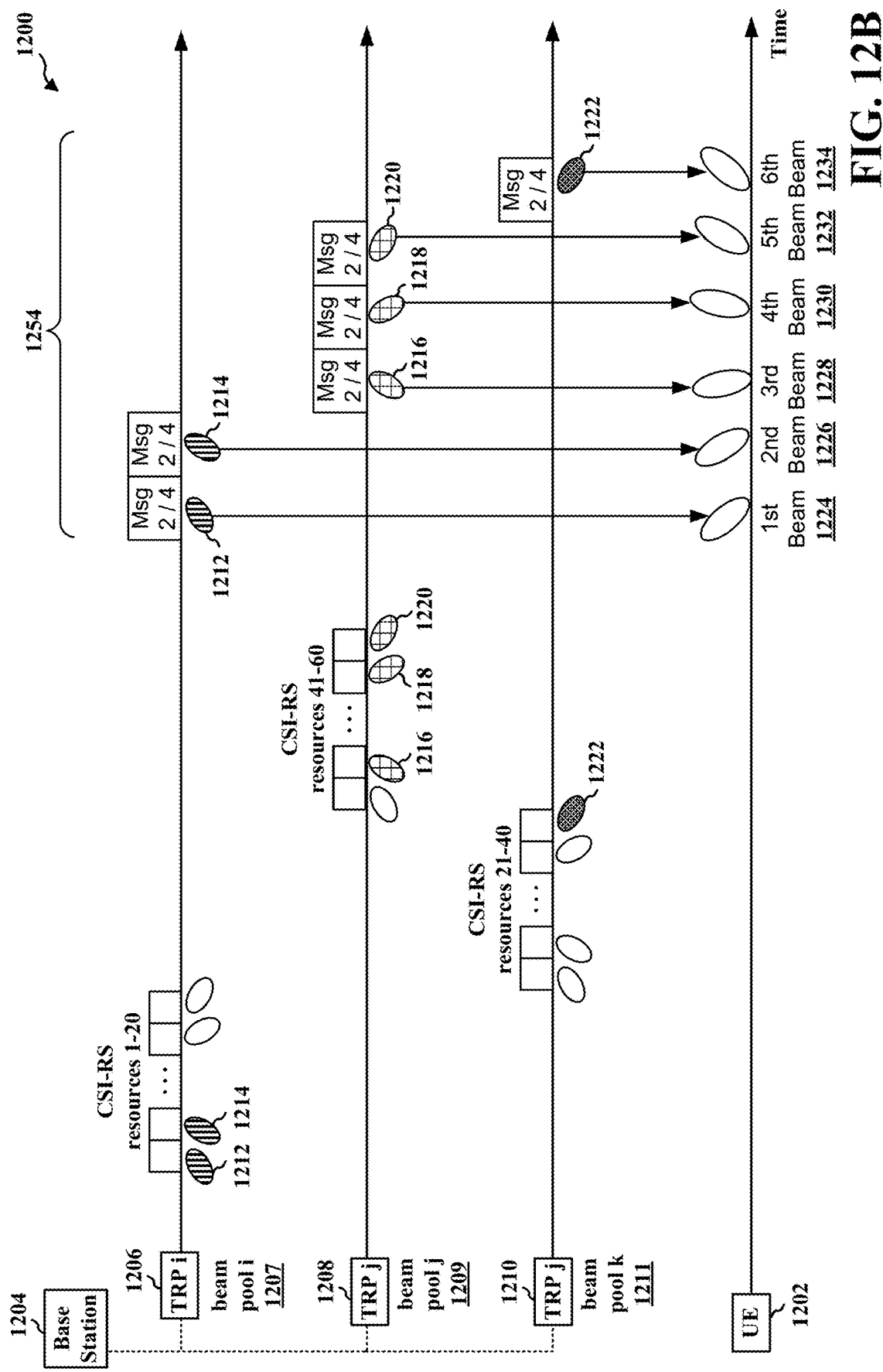

FIGS. 12A and 12B is a diagram 1200 illustrating an example of a RACH procedure based on beam sweeping between a UE and multiple TRPs of a base station according to aspects of the present disclosure. The RACH procedure described herein may include aspects described in connection with any of the examples in FIGS. 4 and 7A to 11.

As shown by FIG. 12A, a UE 1202 may initiate a RACH procedure with a base station 1204 through the first TRP 1206, a second TRP 1208 and a third TRP 1210 of the base station 1204, where the first TRP 1206 may be associated with a first beam pool 1207 and a first TRP index (e.g., TRP index=0), the second TRP 1208 may be associated with a second beam pool 1209 and a second TRP index (e.g., TRP index=1), the third TRP 1210 may be associated with a third beam pool 1211 and a third TRP index (e.g., TRP index=2), etc. Each TRP may transmit one or more reference signals from one or more beams of the TRP, where one reference signal may correspond to one beam of the TRP. For example, as shown at 1250, the first TRP 1206 may transmit multiple CSI-RS from one or more beams of the first TRP 1206 using different CSI-RS resources (e.g., resources #1-20), where the one or more beams of the first TRP 1206 may be selected from the beam pool 1007; the second TRP 1208 may transmit multiple CSI-RS from one or more beams of the second TRP 1208 using different CSI-RS resources (e.g., resources #41-60), where the one or more beams of the second TRP 1208 may be selected from the beam pool 1009; and the third TRP 1210 may transmit multiple CSI-RS from one or more beams of the third TRP 1210 using different CSI-RS resources (e.g., resources #21-40), where the one or more beams of the third TRP 1210 may be selected from the beam pool 1007. In some examples, beams in one beam pool may be configured not to overlap with beams in another beam pool.

After the UE 1202 receives one or more CSI-RS transmitted from the first TRP 1206, the second TRP 1208, and the third TRP 1210, the UE may transmit multiple Msg 1 to the first TRP 1206, the second TRP 1208, and the third TRP 1210 based on beam sweeping, such as described in connection with FIGS. 8 to 11. For example, as shown at 1252 of FIG. 12A, the UE 1202 may transmit a first Msg 1 using a first UE beam 1224 to a beam 1212 of the first TRP 1206, a second Msg 1 using a second UE beam 1226 to a beam 1214 of the first TRP 1206, a third Msg 1 using a third UE beam 1228 to a beam 1216 of the second TRP 1208, a fourth Msg 1 using a fourth UE beam 1230 to a beam 1218 of the second TRP 1208, a fifth Msg 1 using a fifth UE beam 1232 to a beam 1220 of the second TRP 1208, and a sixth Msg 1 using a sixth UE beam 1234 to a beam 1222 of the third TRP 1210. Each of the Msg 1 may include information related to beams used by the UE 1202. Thus, as long as one Msg 1 is successfully received by the base station 1204 or one of the TRPs of the base station 1204, the base station 1204 may know the beam pairs used by the UE 1202 for transmitting the Msg 1. The transmission of Msg 1 may be based on TDM, FDM, SDM or a combination thereof.

After the base station 1204 receives at least one Msg 1 from one of the beams of the UE 1202, the base station 1204 may respond multiple Msg 2 to the UE 1202 based on beam sweeping. For example, as shown at 1254 of FIG. 12B, the base station 1204 may transmit a first Msg 2 to the first UE beam 1224 from the beam 1212 of the first TRP 1206, a second Msg 2 to the second UE beam 1226 from the beam 1214 of the first TRP 1206, a third Msg 2 to the third UE beam 1228 from the beam 1216 of the second TRP 1208, a fourth Msg 2 to the fourth UE beam 1230 from the beam 1218 of the second TRP 1208, a fifth Msg 2 to the fifth UE beam 1232 from the beam 1220 of the second TRP 1208, and a sixth Msg 2 to the sixth UE beam 1234 from the beam 1222 of the third TRP 1210, etc. The Msg 2 may include PDCCH and PDSCH, and beams used for transmitting the PDCCH and PDSCH may be the same, or they may be different. The transmission of Msg 2 may be based on TDM, FDM, SDM or a combination thereof. A Msg 2 (e.g., PDCCH) may carry resource allocation information and/or beam sweeping related information for multiple Msg 2 PDSCHs. Thus, if one of the Msg 2 PDCCHs is received but others are not received, the UE may still be able to receive the Msg 2 PDSCH(s). A Msg 2 PDSCH may carry an uplink grant that includes beam related information, such as a beam sweep pattern and/or a beam configuration, which may be used by the UE for transmitting multiple Msg 3 based on beam sweeping. Thus, after the UE receives at least one Msg 2 PDSCH from a TRP or a cell, the UE may use the uplink resources granted in the Msg 2 to transmit multiple Msg 3 with beam sweeping based at least in part on the beam related information received in the uplink grant.

Based on receiving at least one of Msg 2 from the base station 1204, the UE 1202 may transmit multiple Msg 3 to the base station 1204 based on beam sweeping. For example, the UE 1202 may use beam pairs used for transmitting the Msg 1 for transmitting the Msg 3, where the UE 1202 may transmit a first Msg 3 using the first UE beam 1224 to the beam 1212 of the first TRP 1206, a second Msg 1 using the second UE beam 1226 to the beam 1214 of the first TRP 1206, and so on. The UE 1202 may transmit multiple Msg 3 to the first TRP 1006, the second TRP 1008 and/or the third TRP 1210 based on TDM, SDM, FDM and/or a combination thereof. In some examples, the UE 1202 may select resources for transmitting Msg 3 based on at least one of a beam pool index or a TRP index, such as described in connection with RACH candidate beam pool in FIGS. 10 and 11.

In some examples, the base station 1204 may include an indication in the beam sweep information (e.g., in the Msg 2) to indicate to the UE 1202 whether to apply a same beam sweeping configuration or to apply a different beam sweeping configuration to improve the wireless transmission. For example, if the base station 1204 determines that the received signal strength for one or more beams are below a threshold for the Msg 1, the base station may enable beam repetition for UE in the uplink grant of Msg 2 to improve the transmission reliability for Msg 3. In another example, as the environment or the channel condition between a UE and a base station may change over time, if the base station 1204 receives a more recent beam measurement report that indicates one or more beams having a better beam measurement than those used by the UE 1202 for transmitting the Msg 1, the base station 1204 may indicate to the UE to change one or more sweeping (e.g., transmission) beams for transmitting the Msg 3 PUSCH. In another example, if the base station 1204 determines that the received signal strength for one or more beams of the UE 1202 are below a threshold, the base station may indicate to the UE in the uplink grant to increase beams used for transmitting the Msg 3 and/or to replace one or more beam(s) used for transmitting the Msg 1 with other beam(s) for transmitting the Msg 3.

Based on receiving at least one of Msg 3 from the UE 1202, the base station 1204 may transmit multiple Msg 4 PDCCHs/PDSCHs to the UE 1202 based on beam sweeping, where the transmission of the multiple Msg 4 PDCCHs/PDSCHs may be based on TDM, FDM, SDM or a combination thereof. For example, as shown at 1254 of FIG. 12B, the base station 1204 may transmit a first Msg 4 to the first UE beam 1224 from the beam 1212 of the first TRP 1206, a second Msg 4 to the second UE beam 1226 from the beam 1214 of the first TRP 1206, a third Msg 4 to the third UE beam 1228 from the beam 1216 of the second TRP 1208, and so on. In one example, the first TRP 1206, the second TRP 1208 and/or the third TRP 1210 may apply the same beam sweep pattern(s) (e.g., e.g. beam size, number of beam sweeps/repetition, etc.) and/or configuration(s) that are used for transmitting Msg 2.

If the UE 1202 receives at least one of the Msg 4 from at least one of the TRPs (e.g., 1206, 1208, 1210) of the base station 1204 and the contention resolution is successful, a TC-RNTI associated with the UE 1202 may become an allocated C-RNTI. Then, the UE 1202 may transmit a HARQ feedback (e.g., ACK/NACK) to the PSCell 1004 to complete the RACH procedure, such as via a PUCCH. Similarly, the transmission of the HARQ feedback may be based on beam sweeping using TDM, FDM, SDM or a combination thereof. The UE 1202 may be configured by the base station 1204 via the Msg 2 PDCCH/PDSCH and/or the Msg 4 PDCCH on how to perform the beam sweeping for the HARQ-ACK feedback transmission. Thus, as long as the base station 1204 receives one of the HARQ feedbacks transmitted by the UE 1202, the RACH procedure may be completed.

Figure 13:
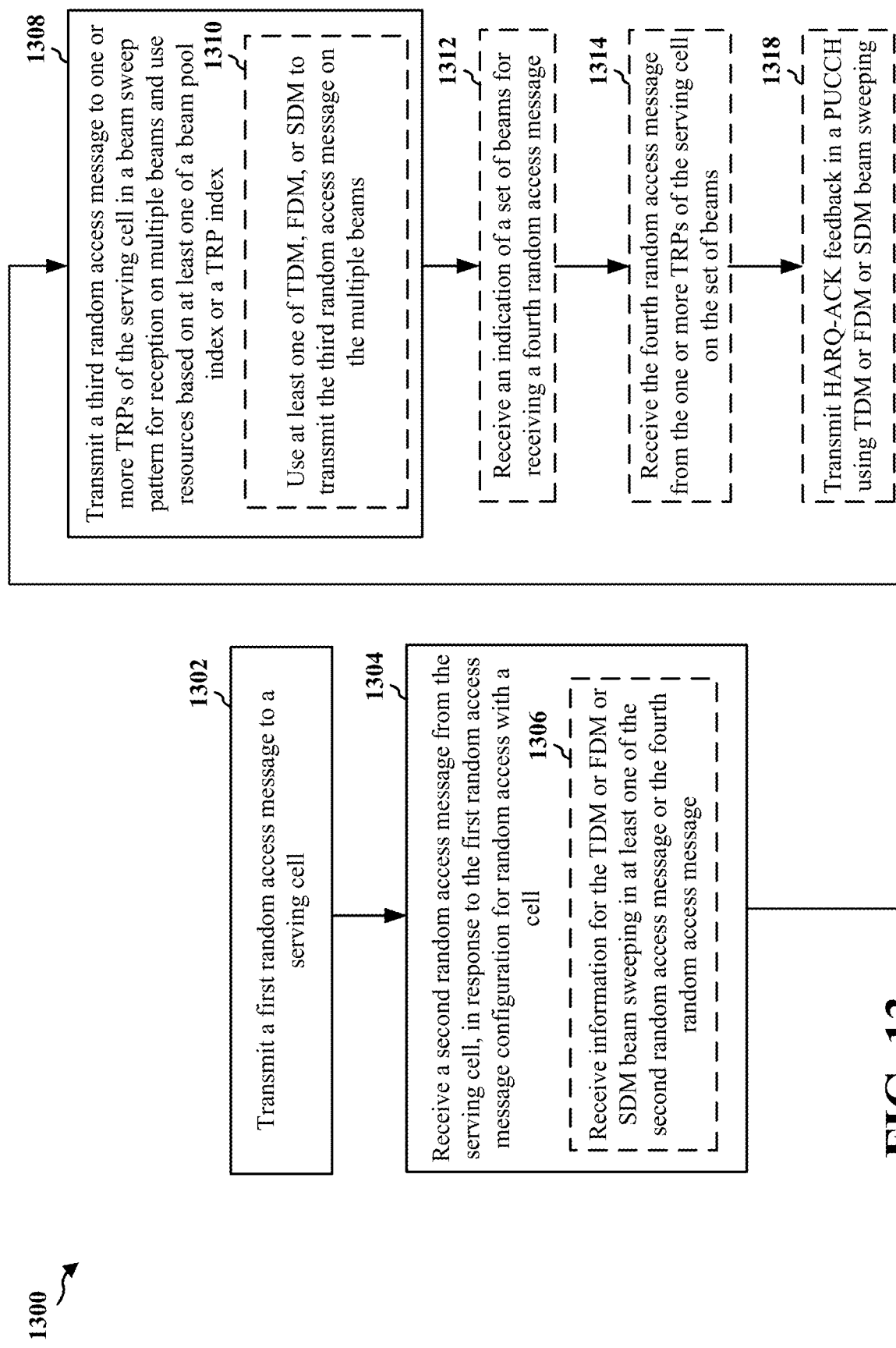
FIG. 13 is a flowchart of a method of wireless communication in accordance with aspects presented herein.

FIG. 13 is a flowchart 1300 of a method of wireless communication. The method may be performed by a UE or a component of a UE (e.g., the UE 104, 350, 402, 502, 702, 802, 902, 1002, 1102, 1202; the apparatus 1402; a processing system, which may include the memory 360 and which may be the entire UE 350 or a component of the UE 350, such as the TX processor 368, the RX processor 356, and/or the controller/processor 359). Optional aspects are illustrated with a dashed line. The method may improve random access between a UE and a base station by providing multiple transmission opportunities and applying beam sweeping for random access transmissions. Aspects of the method may improve reliability of the random access and reduce latency for the random access.

At 1302, the UE may transmit a first random access message to a serving cell, such as described in connection with FIGS. 4 and 7-12. The serving cell may include a PCell, a SCell, and/or a PSCell, such as described in connection with FIGS. 5 and 7-12. For example, as shown at 1118 of FIG. 11A, the UE 1102 may transmit a first random access message (e.g., Msg 1) to the PSCell 1104 through the first TRP 1106 and the second TRP 1108 of the PSCell 1304. The transmission of the first random access message may be performed, e.g., by the Msg 1 process component 1440 and/or the transmission component 1434 of the apparatus 1402 in FIG. 14.

At 1304, the UE may receive a second random access message from the serving cell, in response to the first random access message, such as described in connection with FIGS. 9-12. For example, as shown at 1120 of FIG. 11A, the UE 1102 may receive a second random access message (e.g., Msg 2 PDCCH 1113, Msg 2 PDSCH 1117, etc.) from the second TRP 1108 of the PSCell 1104. The second random access message received by the UE may include a grant for the third random access message, and may also indicate to the UE to use the at least one of TDM, FDM, or SDM to transmit the third random access message on the multiple beams. In some examples, the second random access message may further comprise beam sweep information for the third random access message. In other examples, the third random access message may further indicate a number of repetitions for the third random access message, such as described in connection with FIGS. 11A and 11B. The reception of the second random access message may be performed, e.g., by the Msg 2 reception component 1442 and/or the reception component 1430 of the apparatus 1402 in FIG. 14.

At 1308, the UE may transmit a third random access message to one or more TRPs of the serving cell in a beam sweep pattern for reception (e.g., reception of a random access message) on multiple beams of the UE and use resources based on at least one of a beam pool index or a TRP index, such as described in connection with FIGS. 11A, 11B and 12A. For example, as shown at 1122 of FIG. 11B, the UE 1102 may transmit multiple Msg 3 to the first TRP 1106 and the second TRP 1108 of the PSCell 1104 in a beam sweep pattern for reception on multiple beams, and the UE 1102 may use resources (e.g., beams) selected from beam pools 1107 and 1109 that are associated with the first TRP 1106 and the second TRP 1108 respectively, and each TRP may be associated with a TRP index. In other words, the UE may transmits multiple Msg 3 to multiple TRPs based on a beam sweep pattern (e.g., a beam sweeping using multiple beams), and then in response, the UE may receive multiple Msg 4 from the multiple TRPs or at least one of the multiple TRPs. The transmission of the third random access message may be performed, e.g., by the Msg 3 process component 1444 and/or the transmission component 1434 of the apparatus 1402 in FIG. 14.

In one example, the third random access message may be transmitted for reception on the multiple beams using resources granted in the second random access message. For example, at 1306, the UE may receive beam sweeping related information (e.g., resources and pattern, etc.) for the TDM, FDM, and/or SDM beam sweeping for the third random access message in the second random access message, e.g., in a PDSCH portion of the second random access message. In some examples, the first random access message and the third random access message may be transmitted using a same pattern of the multiple beams. In other examples, the first random access message may be transmitted using a first beam pattern of multiple beams, and the third random access message may be transmitted using a second, different beam pattern of multiple beams. For example, at 1310, the UE may use at least one of TDM, FDM or SDM to transmit the third random access message on the multiple beams, such as described in connection with FIGS. 11A, 11B and 12A.

At 1312, the UE may receive an indication of a set of beams for receiving a fourth random access message, such as described in connection with FIGS. 11B, 11C and 12A. The reception of the indication may be performed, e.g., by the reception component 1430 of the apparatus 1402 in FIG. 14.

In some examples, the UE may receive the indication in the second random access message, such as the PDCCH of the second random access message, where the UE may receive the PDCCH or a PDSCH of the fourth random access message using the set of beams indicated by the indication. In other examples, the UE may receive the indication in a PDCCH of the fourth random access message, and the UE may receive a PDSCH of the fourth random access message using the set of beams indicated in the PDCCH, such as described in connection with FIGS. 11B, 11C and 12B.

At 1314, the UE may receive the fourth random access message from the one or more TRPs of the serving cell on the set of beams, such as described in connection with FIGS. 11B, 11C and 12B. The reception of the fourth random access message may be performed, e.g., by Msg 4 reception component 1446 and/or the reception component 1430 of the apparatus 1402 in FIG. 14. The fourth random access message may be transmitted by the base station based on one or more of TDM, FDM or SDM on the set of beams. The resources for the fourth random access message may be associated with at least one of a beam pool index or a TRP index. In some examples, the UE may use a same set of beams to receive the second random access message and the fourth random access message. In other examples, the set of beams for receiving the fourth random access message may have different beam configuration from beams used to receive the second random access message.

At 1318, the UE may transmit HARQ-ACK feedback (e.g., 1139, 1141) in a PUCCH using TDM, FDM or SDM beam sweeping, such as described in connection with FIG. 11C. The UE, as shown at 1306, may receive beam sweeping related information (e.g., resources and pattern, etc.) for the TDM, FDM, and/or SDM beam sweeping for the HARQ-feedback in at least one of a control part of the second random access message or in the fourth random access message.

Figure 14:
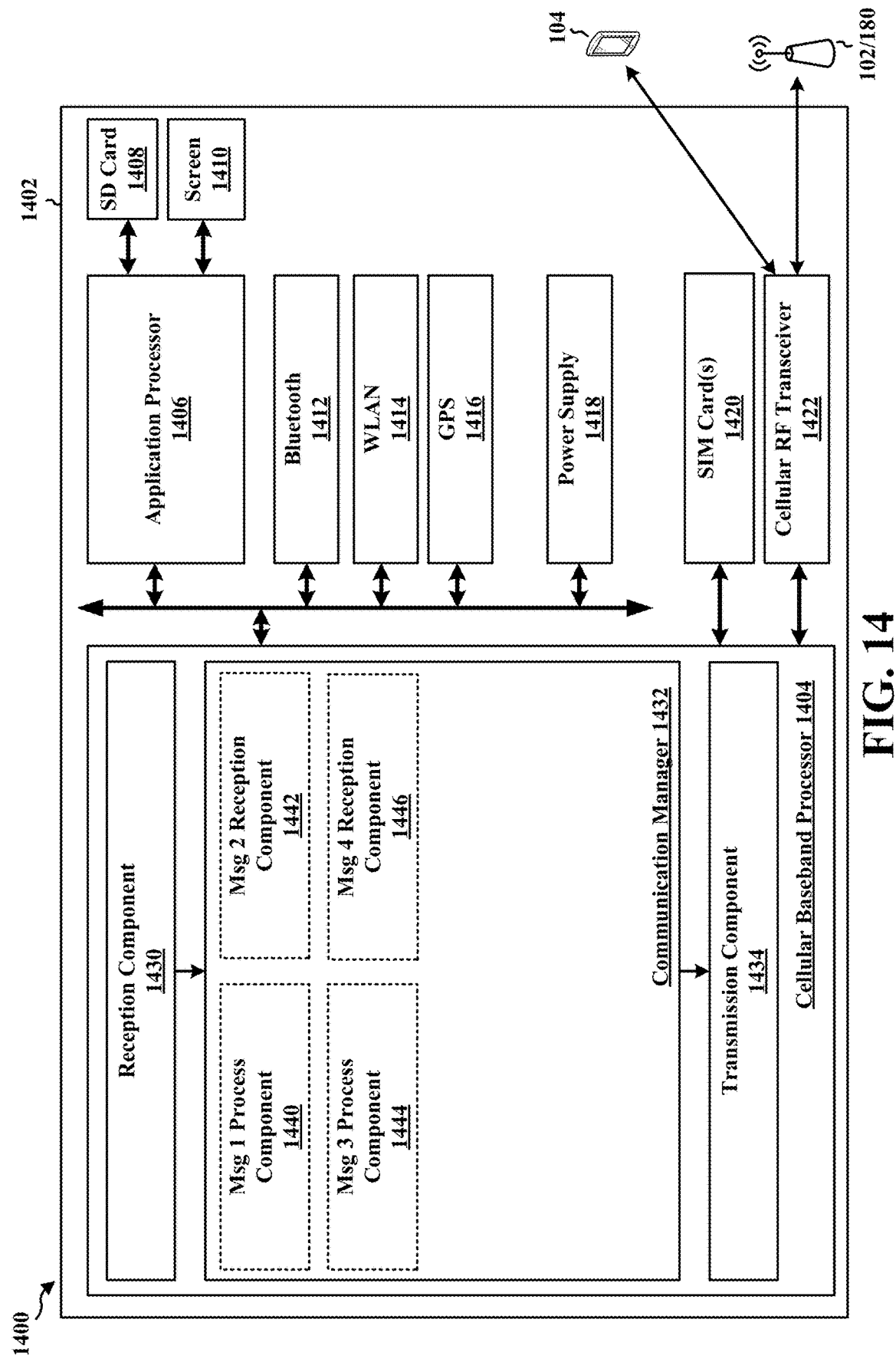
FIG. 14 is a diagram illustrating an example of a hardware implementation for an example apparatus in accordance with aspects presented herein.

FIG. 14 is a diagram 1400 illustrating an example of a hardware implementation for an apparatus 1402. The apparatus 1402 is a UE and includes a cellular baseband processor 1404 (also referred to as a modem) coupled to a cellular RF transceiver 1422 and one or more subscriber identity modules (SIM) cards 1420, an application processor 1406 coupled to a secure digital (SD) card 1408 and a screen 1410, a Bluetooth module 1412, a wireless local area network (WLAN) module 1414, a Global Positioning System (GPS) module 1416, and a power supply 1418. The cellular baseband processor 1404 communicates through the cellular RF transceiver 1422 with the UE 104 and/or BS 102/180. The cellular baseband processor 1404 may include a computer-readable medium/memory. The computer-readable medium/memory may be non-transitory. The cellular baseband processor 1404 is responsible for general processing, including the execution of software stored on the computer-readable medium/memory. The software, when executed by the cellular baseband processor 1404, causes the cellular baseband processor 1404 to perform the various functions described supra. The computer-readable medium/memory may also be used for storing data that is manipulated by the cellular baseband processor 1404 when executing software. The cellular baseband processor 1404 further includes a reception component 1430, a communication manager 1432, and a transmission component 1434. The communication manager 1432 includes the one or more illustrated components. The components within the communication manager 1432 may be stored in the computer-readable medium/memory and/or configured as hardware within the cellular baseband processor 1404. The cellular baseband processor 1404 may be a component of the UE 350 and may include the memory 360 and/or at least one of the TX processor 368, the RX processor 356, and the controller/processor 359. In one configuration, the apparatus 1402 may be a modem chip and include just the baseband processor 1404, and in another configuration, the apparatus 1402 may be the entire UE (e.g., see 350 of FIG. 3) and include the aforediscussed additional modules of the apparatus 1402.

The communication manager 1432 includes a Msg 1 process component 1440 that is configured to transmit a first random access message to a serving cell, e.g., as described in connection with 1302 of FIG. 13. The communication manager 1432 further includes a Msg 2 reception component 1442 that is configured to receive a second random access message from the serving cell, in response to the first random access message, e.g., as described in connection with 1304 of FIG. 13. The communication manager 1432 further includes a Msg 3 process component 1444 that is configured to transmit a third random access message to one or more TRPs of the serving cell in a beam sweep pattern for reception (e.g., of the Msg 4) on multiple beams (e.g., multiple reception beams of the UE) and using resources based on at least one of a beam pool index or a TRP index, e.g., as described in connection with 1308 of FIG. 13. The communication manager 1432 further includes a Msg 4 reception component 1446 that is configured to receive the fourth random access message from the one or more TRPs of the serving cell on the set of beams, e.g., as described in connection with 1314 of FIG. 13.

The apparatus may include additional components that perform each of the blocks of the algorithm in the aforementioned flowchart of FIG. 13. As such, each block in the aforementioned flowchart of FIG. 13 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1402, and in particular the cellular baseband processor 1404, includes means for transmitting a first random access message to a serving cell (e.g., the Msg 1 process component 1440 and/or the transmission component 1430). The apparatus 1402 includes means for receiving a second random access message from the serving cell, in response to the first random access message (e.g., the Msg 2 reception component 1442 and/or the reception component 1430). The apparatus 1402 includes means for transmitting a third random access message to one or more TRPs of the serving cell in a beam sweep pattern for reception on multiple beams of the UE and using resources based on at least one of a beam pool index or a TRP index (e.g., the Msg 3 process component 1444 and/or the transmission component 1434).

The aforementioned means may be one or more of the aforementioned components of the apparatus 1402 configured to perform the functions recited by the aforementioned means. As described supra, the apparatus 1402 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 15:
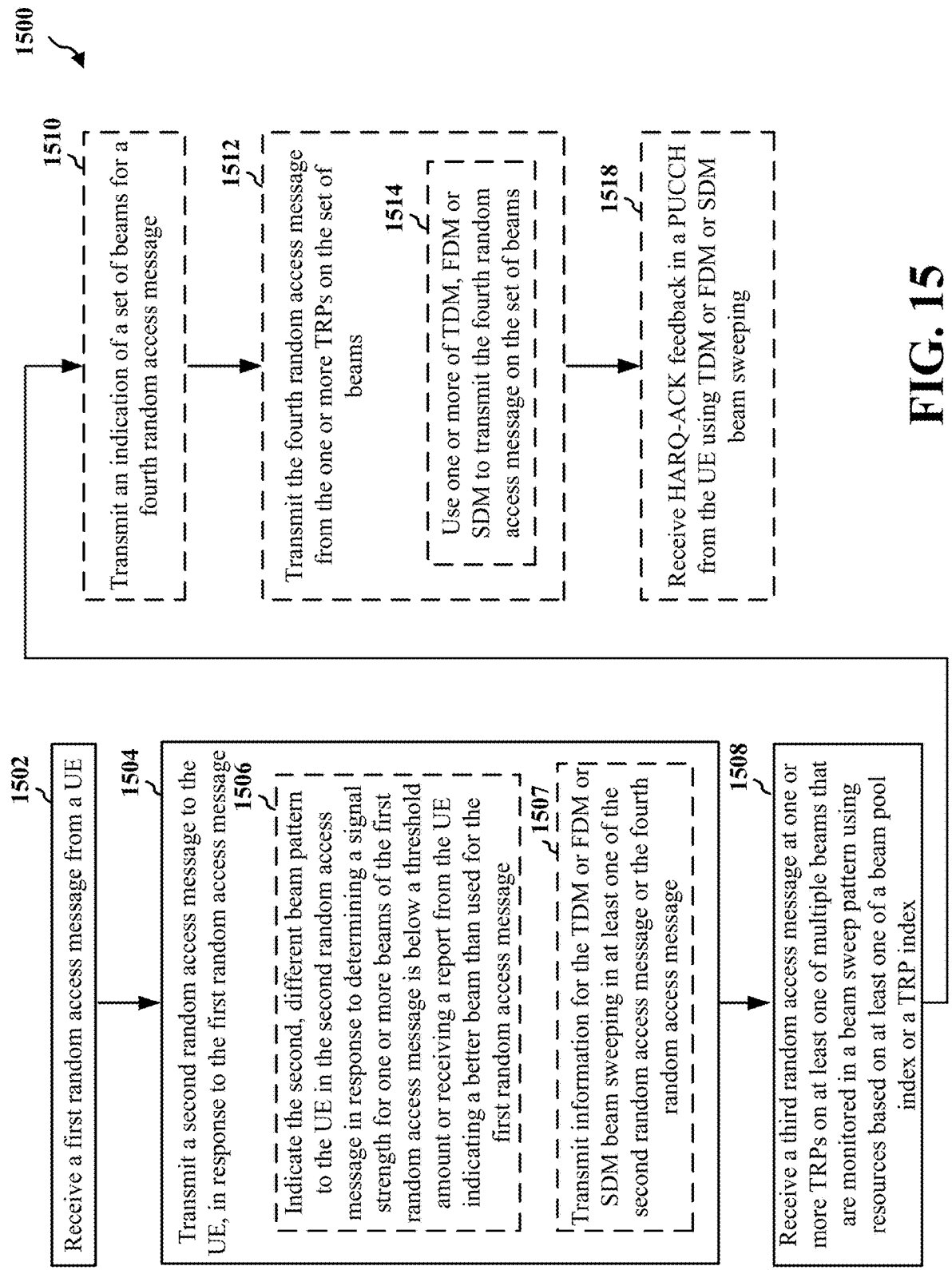
FIG. 15 is a flowchart of a method of wireless communication in accordance with aspects presented herein.

FIG. 15 is a flowchart 1500 of a method of wireless communication. The method may be performed by a base station or a component of a base station (e.g., the base station 102, 180, 310, 404; cell 504, 506, 706, 906, 1004, 1104, 1204; TRPs 704, 806, 808, 1006, 1008, 1106, 1108, 1206, 1208; the apparatus 1602; a processing system, which may include the memory 376 and which may be the entire base station 310 or a component of the base station 310, such as the TX processor 316, the RX processor 370, and/or the controller/processor 375). The method may be performed, e.g., by a PCell, an SCell, or a PSCell for the UE. Optional aspects are illustrated with a dashed line. The method may improve random access between the base station and a UE by providing multiple transmission opportunities and applying beam sweeping for random access transmissions. Aspects of the method may improve reliability of the random access and reduce latency for the random access.

At 1502, the base station may receive a first random access message from a UE, such as described in connection with FIGS. 4 and 7-12. The base station may serve the UE as a PCell, a SCell, or a PSCell, such as described in connection with FIGS. 5 and 7-9. For example, at 1118 of FIG. 11A, the PSCell 1104 may receive Msg 1 from the UE 1102 from the first TRP 1106 and the second TRP 1108 of the PSCell 1104. The reception of the first random access message may be performed, e.g., by the Msg 1 reception component 1640 and/or the reception component 1630 of the apparatus 1602 in FIG. 16.

At 1504, the base station transmits a second random access message to the UE, in response to the first random access message, such as described in connection with FIGS. 9-12. For example, at 1120 of FIG. 11A, the PSCell 1104 may transmit Msg 2 to the UE 1102 from the first TRP 1106 and the second TRP 1108. In one example, the second random access message may include beam sweep information for the third random access message. The transmission of the second random access message may be performed, e.g., by the Msg 2 process component 1642 and/or the transmission component 1634 of the apparatus 1602 in FIG. 16.

At 1508, the base station may receive a third random access message at one or more TRPs on at least one of multiple beams (e.g., multiple reception beams of the one or more TRPs) that are monitored by the base station or the one or more TRPs of the base station in a beam sweep pattern using resources based on at least one of a beam pool index or a TRP index, such as described in connection with FIGS. 11A, 11B and 12A. For example, at 1122 of FIG. 11B, the PSCell 1104 may receive multiple Msg 3 at the first TRP 1106 and the second TRP 1108 of the PSCell 1104, where the first TRP 1106 may be associated with the beam pool 1107 and a first TRP index, and the second TRP 1108 may be associated with the beam pool 1109 and a second TRP index. In other words, the base station may transmit multiple Msg 2 to a UE using multiple beams (e.g., from multiple TRPs and/or multiple beams of TRPs), and in response, the base station may receive one or more Msg 3 from the UE via at least one of the multiple beams of the multiple TRPs. The reception of the third random access message may be performed, e.g., by the Msg 3 reception component 1644 and/or the reception component 1630 of the apparatus 1602 in FIG. 16.

In some examples, the base station may monitor for the third random access message using resources granted to the UE in the second random access message, such as described in connection with FIGS. 11A, 11B and 12A. For example, the base station may receive the first random access message and the third random access message using a same pattern of the multiple beams. In another example, the base station may receive the first random access message using a first beam pattern of multiple beams, and the base station may monitor for the third random access message using a second, different beam pattern of multiple beams. The third random access message may be transmitted based on TDM, FDM or SDM on the multiple beams.

As 1506, the base station may indicate the second, different beam pattern to the UE in the second random access message in response to determining a signal strength for one or more beams of the first random access message is below a threshold amount or receiving a report from the UE indicating a better beam than used for the first random access message. In some examples, the second random access message may include a grant for the third random access message and indicate to the UE to use the at least one of TDM, FDM or SDM to transmit the third random access message on the multiple beams. In other examples, the grant for the third random access message may further indicate a number of repetitions for the third random access message, such as described in connection with FIGS. 11A and 11B.

At 1510, the base station may transmit an indication of a set of beams for a fourth random access message, such as described in connection with FIGS. 11B and 11C. The transmission of the indication may be performed, e.g., by the transmission component 1634 of the apparatus 1602 in FIG. 16. For example, the base station may transmit the indication in the second random access message. In such an example, the base station may transmit the indication in a PDCCH of the second random access message, and the base station may transmit the PDCCH or a PDSCH of the fourth random access message using the set of beams indicated by the indication. In another example, the base station may transmit the indication in a PDCCH of the fourth random access message, and the base station may transmit a PDSCH of the fourth random access message using the set of beams indicated in the PDCCH, such as described in connection with FIGS. 11B and 11C.

At 1512, the base station may transmit the fourth random access message from the one or more TRPs on the set of beams, such as described in connection with FIGS. 11B, 11C and 12B. For example, at 1124 of FIG. 11C, the PSCell 1104 may transmit multiple Msg 4 PDCCH/PDSCH from the first TRP 1106 and the second TRP 1108 of the PSCell 1104 on the set of beams. The transmission of the fourth random access message may be performed, e.g., by the Msg 4 process component 1646 and/or the transmission component 1634 of the apparatus 1602 in FIG. 16. In one example, at 1514, the base station may use one or more of TDM, FDM or SDM to transmit the fourth random access message on the set of beams. In some examples, the resources for the fourth random access message may be based on at least one of a beam pool index or a TRP index. In other examples, the base station may use a same set of beams to transmit the second random access message and the fourth random access message. In other examples, the set of beams for transmitting the fourth random access message may have different beam configuration from beams used to transmit the second random access message.

At 1518, the base station may receive HARQ-ACK feedback in a PUCCH (e.g., 1159, 1141) from the UE using TDM, FDM or SDM beam sweeping. The reception of the HARQ-ACK feedback may be performed, e.g., by the reception component 1630 of the apparatus 1602 in FIG. 16.

In some examples, the base station may transmit information for the TDM, FDM, and/or SDM beam sweeping in the second random access message, as shown at 1507. For example, the base station may transmit the TDM, FDM, and/or SDM beam sweeping information in a PDSCH portion of the second random access message. Alternately, the base station may transmit the information for the TDM, FDM and/or SDM beam sweeping in the fourth random access message.

Figure 16:
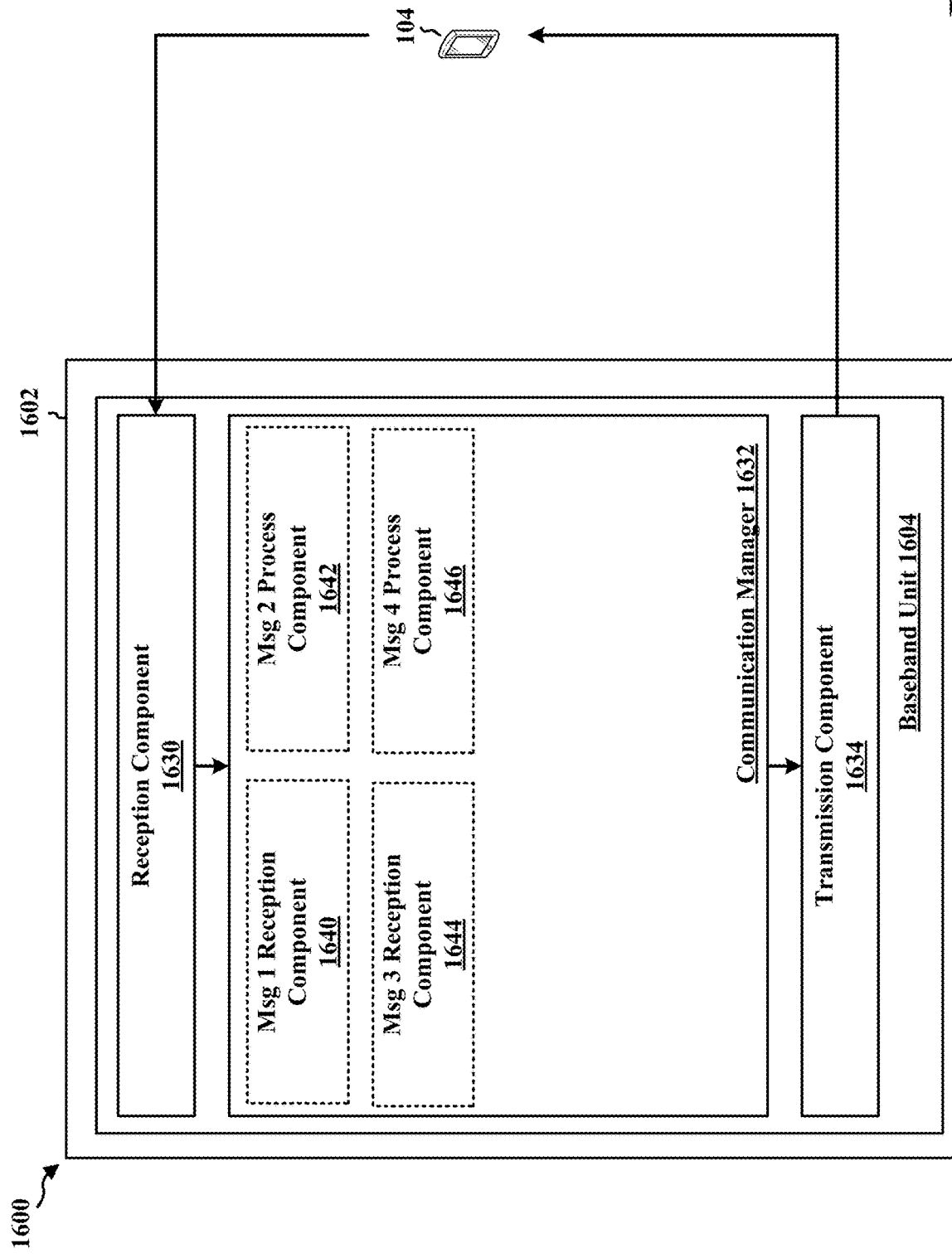
FIG. 16 is a diagram illustrating an example of a hardware implementation for an example apparatus in accordance with aspects presented herein.

FIG. 16 is a diagram 1600 illustrating an example of a hardware implementation for an apparatus 1602. The apparatus 1602 is a BS and includes a baseband unit 1604. The baseband unit 1604 may communicate through a cellular RF transceiver with the UE 104. The baseband unit 1604 may include a computer-readable medium/memory. The baseband unit 1604 is responsible for general processing, including the execution of software stored on the computer-readable medium/memory. The software, when executed by the baseband unit 1604, causes the baseband unit 1604 to perform the various functions described supra. The computer-readable medium/memory may also be used for storing data that is manipulated by the baseband unit 1604 when executing software. The baseband unit 1604 further includes a reception component 1630, a communication manager 1632, and a transmission component 1634. The communication manager 1632 includes the one or more illustrated components. The components within the communication manager 1632 may be stored in the computer-readable medium/memory and/or configured as hardware within the baseband unit 1604. The baseband unit 1604 may be a component of the base station 310 and may include the memory 376 and/or at least one of the TX processor 316, the RX processor 370, and the controller/processor 375.

The communication manager 1632 includes a Msg 1 reception component 1640 that is configured to receive a first random access message from a UE, e.g., as described in connection with 1502 of FIG. 15. The communication manager 1632 further includes a Msg 2 process component 1642 that is configured to transmit a second random access message to the UE, in response to the first random access message, e.g., as described in connection with 1504 of FIG. 15. The communication manager 1632 further includes a Msg 1 reception component 1644 that is configured to receive a third random access message at one or more TRPs on at least one of multiple beams (e.g., reception beams) of the one or more TRPs that are monitored in a beam sweep pattern using resources based on at least one of a beam pool index or a TRP index, e.g., as described in connection with 1508 of FIG. 15. The communication manager 1632 further includes a Msg 4 process component 1646 that is configured to transmit the fourth random access message from the one or more TRPs on the set of beams, e.g., as described in connection with 1512 of FIG. 15.

The apparatus may include additional components that perform each of the blocks of the algorithm in the aforementioned flowchart of FIG. 15. As such, each block in the aforementioned flowchart of FIG. 15 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1602, and in particular the baseband unit 1604, includes means for receiving a first random access message from a UE (e.g., the Msg 1 reception component 1640 and/or the reception component 1630). The apparatus 1602 includes means for transmitting a second random access message to the UE, in response to the first random access message (e.g., the Msg 2 process component 1642 and/or the transmission component 1634). The apparatus 1602 includes means for receiving a third random access message at one or more TRPs on at least one of multiple reception beams of the one or more TRPs that are monitored in a beam sweep pattern using resources based on at least one of a beam pool index or a TRP index (e.g., the Msg 3 reception component 1644 and/or the reception component 1630). The apparatus 1602 includes means for transmitting the fourth random access message from the one or more TRPs on the set of beams (e.g., the Msg 4 process component 1646 and/or the transmission component 1634).

The aforementioned means may be one or more of the aforementioned components of the apparatus 1602 configured to perform the functions recited by the aforementioned means. As described supra, the apparatus 1602 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

The following examples set forth additional aspects and are illustrative only and aspects thereof may be combined with aspects of other examples or teaching described herein, without limitation.

Aspect 1 is a method of wireless communication at a UE, comprising: transmitting a first random access message to a serving cell; receiving a second random access message from the serving cell, in response to the first random access message; and transmitting a third random access message to one or more TRPs of the serving cell in a beam sweep pattern for reception on multiple beams and using resources based on at least one of a beam pool index or a TRP index.

In aspect 2, the method of aspect 1 further includes that the serving cell comprises a PCell, a SCell, or a PSCell.

In aspect 3, the method of aspect 1 or aspect 2 further includes that the third random access message is transmitted for reception on the multiple beams using resources granted in the second random access message.

In aspect 4, the method of any of aspects 1-3 further includes that the second random access message comprises beam sweep information for the third random access message.

In aspect 5, the method of any of aspects 1-4 further includes that the first random access message and the third random access message are transmitted using a same pattern of the multiple beams.

In aspect 6, the method of any of aspects 1-5 further includes that the first random access message is transmitted using a first beam pattern of multiple beams, and the third random access message is transmitted using a second, different beam pattern of multiple beams.

In aspect 7, the method of any of aspects 1-6 further comprises: using at least one of TDM, FDM, or SDM to transmit the third random access message on the multiple beams.

In aspect 8, the method of any of aspects 1-7 further includes that the second random access message comprises a grant for the third random access message and indicates to the UE to use the at least one of TDM, FDM, or SDM to transmit the third random access message on the multiple beams.

In aspect 9, the method of any of aspects 1-8 further includes that the grant for the third random access message further indicates a number of repetitions for the third random access message.

In aspect 10, the method of any of aspects 1-9 further comprises: receiving an indication of a set of beams for receiving a fourth random access message; and receiving the fourth random access message from the one or more TRPs of the serving cell on the set of beams.

In aspect 11, the method of any of aspects 1-10 further includes that the fourth random access message is one or more of TDM, FDM, or SDM on the set of beams.

In aspect 12, the method of any of aspects 1-11 further includes that resources for the fourth random access message are based on at least one of a beam pool index or a TRP index.

In aspect 13, the method of any of aspects 1-12 further includes that the UE uses a same set of beams to receive the second random access message and the fourth random access message.

In aspect 14, the method of any of aspects 1-13 further includes that the indication is received in the second random access message.

In aspect 15, the method of any of aspects 1-14 further includes that the set of beams for receiving the fourth random access message have different beam configuration from beams used to receive the second random access message.

In aspect 16, the method of any of aspects 1-15 further includes that the indication is received in a PDCCH of the second random access message, and wherein the UE receives the PDCCH or a physical downlink shared channel of the fourth random access message using the set of beams indicated by the indication.

In aspect 17, the method of any of aspects 1-16 further includes that the indication is received in a PDCCH of the fourth random access message, and the UE receives a PDSCH of the fourth random access message using the set of beams indicated in the PDCCH.

In aspect 18, the method of any of aspects 1-17 further comprises: transmitting HARQ-ACK feedback in a (PUCCH using TDM or FDM or SDM beam sweeping.

In aspect 19, the method of any of aspects 1-18 further comprises: receiving information for the TDM or FDM or SDM beam sweeping in at least one of a control part of the second random access message or the fourth random access message.

Aspect 20 is an apparatus for wireless communication, comprising: means for transmitting a first random access message to one or more TRPs of a serving cell; means for receiving a second random access message from the serving cell, in response to the first random access message; and means for transmitting a third random access message to the serving cell in a beam sweep pattern for reception on multiple beams and using resources based on at least one of a beam pool index or a TRP index.

In aspect 21, the apparatus of aspect 20 further comprises means to perform the method of any of claims 2-19.

Aspect 22 is an apparatus for wireless communication, comprising: a memory; and at least one processor coupled to the memory, the memory and the at least one processor configured to: transmit a first random access message to a serving cell; receive a second random access message from the serving cell, in response to the first random access message; and transmit a third random access message to one or more TRPs of the serving cell in a beam sweep pattern for reception on multiple beams and using resources based on at least one of a beam pool index or a TRP index.

In aspect 23, the apparatus of aspect 22 further includes that the memory and the at least one processor are further configured to perform the method of any of claims 2-19.

Aspect 24 is a non-transitory computer-readable storage medium storing computer executable code for wireless communication, the code when executed by a processor cause the processor to perform the method of any of claims 1-19.

Aspect 25 is a method of wireless communication at a base station, comprising: receiving a first random access message from a UE; transmitting a second random access message to the UE from the one or more TRPs, in response to the first random access message; and receiving a third random access message at one or more TRPs on at least one of multiple beams that are monitored in a beam sweep pattern using resources based on at least one of a beam pool index or a TRP index.

In aspect 26, the method of aspect 25 further includes that the UE is served by the base station as a PCell, an SCell, or a PSCell.

In aspect 27, the method of aspect 25 or aspect 26 further includes that the base station monitors for the third random access message using resources granted to the UE in the second random access message.

In aspect 28, the method of any of aspects 25-27 further includes that the second random access message comprises beam sweep information for the third random access message.

In aspect 29, the method of any of aspects 25-28 further includes that the base station receives the first random access message and the third random access message using a same pattern of the multiple beams.

In aspect 30, the method of any of aspects 25-29 further includes that the first random access message is received using a first beam pattern of multiple beams, and the base station monitors for the third random access message using a second, different beam pattern of multiple beams.

In aspect 31, the method of any of aspects 25-30 further comprises: indicating the second, different beam pattern to the UE in the second random access message in response to determining a signal strength for one or more beams of the first random access message is below a threshold amount or receiving a report from the UE indicating a better beam than used for the first random access message.

In aspect 32, the method of any of aspects 25-31 further includes that the third random access message is one or more of TDM, FDM, or SDM on the multiple beams.

In aspect 33, the method of any of aspects 25-32 further includes that the second random access message comprises a grant for the third random access message and indicates to the UE to use the at least one of TDM, FDM, or SDM to transmit the third random access message on the multiple beams.

In aspect 34, the method of any of aspects 25-33 further includes that the grant for the third random access message further indicates a number of repetitions for the third random access message.

In aspect 35, the method of any of aspects 25-34 further comprises: transmitting an indication of a set of beams for a fourth random access message; and transmitting the fourth random access message from the one or more TRPs on the set of beams.

In aspect 36, the method of any of aspects 25-35 further comprises: using one or more of TDM, FDM, or SDM to transmit the fourth random access message on the set of beams.

In aspect 37, the method of any of aspects 25-36 further includes that resources for the fourth random access message are based on at least one of a beam pool index or a TRP index.

In aspect 38, the method of any of aspects 25-37 further includes that the base station uses a same set of beams to transmit the second random access message and the fourth random access message.

In aspect 39, the method of any of aspects 25-38 further includes that the indication is transmitted in the second random access message.

In aspect 40, the method of any of aspects 25-39 further includes that the set of beams for transmitting the fourth random access message have different beam configuration from beams used to transmit the second random access message.

In aspect 41, the method of any of aspects 25-40 further includes that the base station transmits the indication in a PDCCH of the second random access message, and wherein the base station transmits the PDCCH or a physical downlink shared channel of the fourth random access message using the set of beams indicated by the indication.

In aspect 42, the method of any of aspects 25-41 further includes that the base station transmits the indication in a PDCCH of the fourth random access message, and wherein the base station transmits a PDSCH of the fourth random access message using the set of beams indicated in the PDCCH.

In aspect 43, the method of any of aspects 25-42 further comprises: receiving HARQ-ACK feedback in a PUCCH from the UE using TDM, FDM, or SDM beam sweeping.

In aspect 44, the method of any of aspects 25-43 further comprises: transmitting information for the TDM or FDM or SDM beam sweeping in at least one of a control part of the second random access message or the fourth random access message.

Aspect 45 is an apparatus for wireless communication, comprising: means for receiving a first random access message from a UE; means for transmitting a second random access message to the UE, in response to the first random access message; and means for receiving a third random access message at one or more TRPs on at least one of multiple beams that are monitored in a beam sweep pattern using resources based on at least one of a beam pool index or a TRP index.

In aspect 46, the apparatus of aspect 45 further comprises means to perform the method of any of claims 26-44.

Aspect 47 is an apparatus for wireless communication, comprising: a memory; and at least one processor coupled to the memory, the memory and the at least one processor configured to: receive a first random access message from a UE; transmit a second random access message to the UE, in response to the first random access message; and receive a third random access message at one or more TRPs on at least one of multiple beams that are monitored in a beam sweep pattern using resources based on at least one of a beam pool index or a TRP index.

In aspect 48, the apparatus of aspect 47 further includes that the memory and the at least one processor are further configured to perform the method of any of claims 26-44.

Aspect 49 is a non-transitory computer-readable storage medium storing computer executable code for wireless communication at a base station, the code when executed by a processor cause the processor to perform the method of any of claims 25-44.

Aspect 51 is a method of wireless communication at a UE, comprising: transmitting a first random access message to a serving cell; receiving a second random access message from the serving cell, in response to the first random access message; and transmitting a third random access message to one or more TRPs of the serving cell in a beam sweep pattern for reception of a fourth random access messages on multiple beams (e.g., multiple reception beams) of the UE and using resources based on at least one of a beam pool index or a TRP index.

In aspect 52, the method of aspect 51 further includes that the serving cell comprises a PCell, a SCell, or a PSCell.

In aspect 53, the method of aspect 51 or aspect 52 further includes that the third random access message is transmitted for reception on the multiple beams using resources granted in the second random access message.

In aspect 54, the method of any of aspects 51-53 further includes that the second random access message comprises beam sweep information for the third random access message.

In aspect 55, the method of any of aspects 51-54 further includes that the first random access message and the third random access message are transmitted using a same pattern of the multiple beams.

In aspect 56, the method of any of aspects 51-55 further includes that the first random access message is transmitted using a first beam pattern of multiple beams, and the third random access message is transmitted using a second, different beam pattern of multiple beams.

In aspect 57, the method of any of aspects 51-56 further comprises: using at least one of TDM, FDM, or SDM to transmit the third random access message on the multiple beams.

In aspect 58, the method of any of aspects 51-57 further includes that the second random access message comprises a grant for the third random access message and indicates to the UE to use the at least one of TDM, FDM, or SDM to transmit the third random access message on the multiple beams.

In aspect 59, the method of any of aspects 51-58 further includes that the grant for the third random access message further indicates a number of repetitions for the third random access message.

In aspect 60, the method of any of aspects 51-59 further comprises: receiving an indication of a set of beams for receiving a fourth random access message; and receiving the fourth random access message from the one or more TRPs of the serving cell on the set of beams.

In aspect 61, the method of any of aspects 51-60 further includes that the fourth random access message is one or more of TDM, FDM, or SDM on the set of beams.

In aspect 62, the method of any of aspects 51-61 further includes that resources for the fourth random access message are based on at least one of a beam pool index or a TRP index.

In aspect 63, the method of any of aspects 51-62 further includes that the UE uses a same set of beams to receive the second random access message and the fourth random access message.

In aspect 64, the method of any of aspects 51-63 further includes that the indication is received in the second random access message.

In aspect 65, the method of any of aspects 51-64 further includes that the set of beams for receiving the fourth random access message have different beam configuration from beams used to receive the second random access message.

In aspect 66, the method of any of aspects 51-65 further includes that the indication is received in a PDCCH of the second random access message, and wherein the UE receives the PDCCH or a physical downlink shared channel of the fourth random access message using the set of beams indicated by the indication.

In aspect 67, the method of any of aspects 51-66 further includes that the indication is received in a PDCCH of the fourth random access message, and the UE receives a PDSCH of the fourth random access message using the set of beams indicated in the PDCCH.

In aspect 68, the method of any of aspects 51-67 further comprises: transmitting HARQ-ACK feedback in a (PUCCH using TDM or FDM or SDM beam sweeping.

In aspect 69, the method of any of aspects 51-68 further comprises: receiving information for the TDM or FDM or SDM beam sweeping in at least one of a control part of the second random access message or the fourth random access message.

Aspect 70 is an apparatus for wireless communication, comprising: means for transmitting a first random access message to one or more TRPs of a serving cell; means for receiving a second random access message from the serving cell, in response to the first random access message; and means for transmitting a third random access message to the serving cell in a beam sweep pattern for reception of a fourth random access messages on multiple beams of the UE and using resources based on at least one of a beam pool index or a TRP index.

In aspect 71, the apparatus of aspect 70 further comprises means to perform the method of any of claims 52-69.

Aspect 72 is an apparatus for wireless communication, comprising: a memory; and at least one processor coupled to the memory, the memory and the at least one processor configured to: transmit a first random access message to a serving cell; receive a second random access message from the serving cell, in response to the first random access message; and transmit a third random access message to one or more TRPs of the serving cell in a beam sweep pattern for reception of a fourth random access messages on multiple beams of the UE and using resources based on at least one of a beam pool index or a TRP index.

In aspect 73, the apparatus of aspect 72 further includes that the memory and the at least one processor are further configured to perform the method of any of claims 52-69.

Aspect 74 is a non-transitory computer-readable storage medium storing computer executable code for wireless communication, the code when executed by a processor cause the processor to perform the method of any of claims 51-69.

Aspect 75 is a method of wireless communication at a base station, comprising:

receiving a first random access message from a UE; transmitting a second random access message to the UE from the one or more TRPs, in response to the first random access message; and receiving a third random access message at one or more TRPs on at least one of multiple beams (e.g., multiple reception beams) of the one or more TRPs that are monitored by the base station or the one or more TRPs of the base station in a beam sweep pattern using resources based on at least one of a beam pool index or a TRP index.

In aspect 76, the method of aspect 75 further includes that the UE is served by the base station as a PCell, an SCell, or a PSCell.

In aspect 77, the method of aspect 75 or aspect 76 further includes that the base station monitors for the third random access message using resources granted to the UE in the second random access message.

In aspect 78, the method of any of aspects 75-77 further includes that the second random access message comprises beam sweep information for the third random access message.

In aspect 79, the method of any of aspects 75-78 further includes that the base station receives the first random access message and the third random access message using a same pattern of the multiple beams.

In aspect 80, the method of any of aspects 75-79 further includes that the first random access message is received using a first beam pattern of multiple beams, and the base station monitors for the third random access message using a second, different beam pattern of multiple beams.

In aspect 81, the method of any of aspects 75-80 further comprises: indicating the second, different beam pattern to the UE in the second random access message in response to determining a signal strength for one or more beams of the first random access message is below a threshold amount or receiving a report from the UE indicating a better beam than used for the first random access message.

In aspect 82, the method of any of aspects 75-81 further includes that the third random access message is one or more of TDM, FDM, or SDM on the multiple beams.

In aspect 83, the method of any of aspects 75-82 further includes that the second random access message comprises a grant for the third random access message and indicates to the UE to use the at least one of TDM, FDM, or SDM to transmit the third random access message on the multiple beams.

In aspect 84, the method of any of aspects 75-83 further includes that the grant for the third random access message further indicates a number of repetitions for the third random access message.

In aspect 85, the method of any of aspects 75-84 further comprises: transmitting an indication of a set of beams for a fourth random access message; and transmitting the fourth random access message from the one or more TRPs on the set of beams.

In aspect 86, the method of any of aspects 75-85 further comprises: using one or more of TDM, FDM, or SDM to transmit the fourth random access message on the set of beams.

In aspect 87, the method of any of aspects 75-86 further includes that resources for the fourth random access message are based on at least one of a beam pool index or a TRP index.

In aspect 88, the method of any of aspects 75-87 further includes that the base station uses a same set of beams to transmit the second random access message and the fourth random access message.

In aspect 89, the method of any of aspects 75-88 further includes that the indication is transmitted in the second random access message.

In aspect 90, the method of any of aspects 75-89 further includes that the set of beams for transmitting the fourth random access message have different beam configuration from beams used to transmit the second random access message.

In aspect 91, the method of any of aspects 75-90 further includes that the base station transmits the indication in a PDCCH of the second random access message, and wherein the base station transmits the PDCCH or a physical downlink shared channel of the fourth random access message using the set of beams indicated by the indication.

In aspect 92, the method of any of aspects 75-91 further includes that the base station transmits the indication in a PDCCH of the fourth random access message, and wherein the base station transmits a PDSCH of the fourth random access message using the set of beams indicated in the PDCCH.

In aspect 93, the method of any of aspects 75-92 further comprises: receiving HARQ-ACK feedback in a PUCCH from the UE using TDM, FDM, or SDM beam sweeping.

In aspect 94, the method of any of aspects 75-93 further comprises: transmitting information for the TDM or FDM or SDM beam sweeping in at least one of a control part of the second random access message or the fourth random access message.

Aspect 95 is an apparatus for wireless communication, comprising: means for receiving a first random access message from a UE; means for transmitting a second random access message to the UE, in response to the first random access message; and means for receiving a third random access message at one or more TRPs on at least one of multiple beams of the one or more TRPs that are monitored by the base station or the one or more TRPs of the base station in a beam sweep pattern using resources based on at least one of a beam pool index or a TRP index.

In aspect 96, the apparatus of aspect 95 further comprises means to perform the method of any of claims 76-94.

Aspect 97 is an apparatus for wireless communication, comprising: a memory; and at least one processor coupled to the memory, the memory and the at least one processor configured to: receive a first random access message from a UE; transmit a second random access message to the UE, in response to the first random access message; and receive a third random access message at one or more TRPs on at least one of multiple beams of the one or more TRPs that are monitored by the base station or the one or more TRPs of the base station in a beam sweep pattern using resources based on at least one of a beam pool index or a TRP index.

In aspect 98, the apparatus of aspect 97 further includes that the memory and the at least one processor are further configured to perform the method of any of claims 76-94.

Aspect 99 is a non-transitory computer-readable storage medium storing computer executable code for wireless communication at a base station, the code when executed by a processor cause the processor to perform the method of any of claims 75-94.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a user equipment (UE), comprising:
   transmitting a first random access message to a serving cell;
   receiving a second random access message from the serving cell, in response to the first random access message; and
   transmitting a third random access message to one or more transmission reception points (TRPs) of the serving cell in a beam sweep pattern for reception on multiple beams and using resources for the beam sweep pattern of the third random access message based on at least one of a beam pool index or a TRP index.

2. The method of claim 1, wherein the serving cell comprises a primary cell (PCell), a secondary cell (SCell), or a primary secondary cell (PSCell).

3. The method of claim 1, wherein the UE transmits the first random access message using a first beam pattern of multiple beams and transmits the third random access message using a second, different beam pattern of multiple beams.

4. The method of claim 1, further comprising:
   using at least one of time division multiplexing (TDM), frequency division multiplexing (FDM), or space division multiplexing (SDM) to transmit the third random access message on the multiple beams.

5. The method of claim 4, wherein the second random access message comprises a grant for the third random access message and indicates to the UE to use the at least one of TDM, FDM, or SDM to transmit the third random access message on the multiple beams.

6. The method of claim 5, wherein the grant for the third random access message further indicates a number of repetitions for the third random access message.

7. The method of claim 1, further comprising:
   using a same pattern of the multiple beams to transmit the first random access message and the third random access message.

8. The method of claim 1, further comprising:
   receiving an indication of a set of beams for receiving a fourth random access message; and
   receiving the fourth random access message from the one or more TRPs of the serving cell on the set of beams.

9. The method of claim 8, further comprising:
   performing one or more of time division multiplexing (TDM), frequency division multiplexing (FDM), or space division multiplexing (SDM) to transmit the fourth random access message on the set of beams.

10. The method of claim 8, wherein resources for the fourth random access message are based on at least one of the beam pool index or the TRP index.

11. The method of claim 8, further comprising:
    using a same set of beams to receive the second random access message and the fourth random access message.

12. The method of claim 8, wherein the indication is received in the second random access message, wherein the set of beams for receiving the fourth random access message comprise a different beam configuration than beams used to receive the second random access message.

13. The method of claim 8, wherein the UE receives the indication in a physical downlink control channel (PDCCH) of the second random access message, and wherein the UE receives the PDCCH or a physical downlink shared channel (PDSCH) of the fourth random access message using the set of beams indicated by the indication.

14. The method of claim 8, wherein the UE receives the indication in a physical downlink control channel (PDCCH) of the fourth random access message, and the UE receives a physical downlink shared channel (PDSCH) of the fourth random access message using the set of beams indicated in the PDCCH.

15. The method of claim 8, further comprising:
    transmitting hybrid automatic repeat request acknowledgement (HARQ-ACK) feedback in a physical uplink control channel (PUCCH) using time division multiplexing (TDM), frequency division multiplexing (FDM), or spatial division multiplexing (SDM) beam sweeping.

16. The method of claim 15, further comprising:
    receiving information for the TDM, FDM, or SDM beam sweeping in at least one of a control part of the second random access message or the fourth random access message.

17. An apparatus for wireless communication at a user equipment (UE), comprising:
    means for transmitting a first random access message to one or more transmission reception points (TRPs) of a serving cell;
    means for receiving a second random access message from the serving cell, in response to the first random access message; and
    means for transmitting a third random access message to the serving cell in a beam sweep pattern for reception on multiple beams and using resources for the beam sweep pattern of the third random access message based on at least one of a beam pool index or a TRP index.

18. A method of wireless communication at a base station, comprising:
    receiving a first random access message from a user equipment (UE);
    transmitting a second random access message to the UE, in response to the first random access message; and
    receiving a third random access message at one or more transmission reception points (TRPs) on at least one of multiple beams that are monitored in a beam sweep pattern using resources for the beam sweep pattern of the third random access message based on at least one of a beam pool index or a TRP index.

19. The method of claim 18, further comprising:
    serving the UE as a primary cell (PCell), a secondary cell (SCell), or a primary secondary cell (PSCell).

20. The method of claim 18, wherein the base station receives the first random access message using a first beam pattern of multiple beams, and the base station monitors for the third random access message using a second, different beam pattern of multiple beams.

21. The method of claim 20, further comprising:
indicating the second, different beam pattern to the UE in the second random access message in response to determining a signal strength for one or more beams of the first random access message is below a threshold amount or receiving a report from the UE indicating a better beam than used for the first random access message.

22. The method of claim 18, wherein the third random access message is one or more of time division multiplexed (TDM), frequency division multiplexed (FDM), or space division multiplexed (SDM) on the multiple beams, wherein the second random access message comprises a grant for the third random access message and indicates to the UE to use the at least one of TDM, FDM, or SDM to transmit the third random access message on the multiple beams.

23. The method of claim 18, further comprising:
transmitting an indication of a set of beams for a fourth random access message; and
transmitting the fourth random access message from the one or more TRPs on the set of beams.

24. The method of claim 23, further comprising:
using one or more of time division multiplexing (TDM), frequency division multiplexing (FDM), or space division multiplexing (SDM) to transmit the fourth random access message on the set of beams.

25. The method of claim 23, wherein resources for the fourth random access message are based on at least one of the beam pool index or the TRP index.

26. The method of claim 23, further comprising:
using a same set of beams to transmit the second random access message and the fourth random access message.

27. The method of claim 23, wherein the base station transmits the indication in the second random access message, wherein the set of beams for transmitting the fourth random access message comprise a different beam configuration than beams used to transmit the second random access message.

28. The method of claim 23, wherein the base station transmits the indication in a physical downlink control channel (PDCCH) of the second random access message and transmits the PDCCH or a physical downlink shared channel (PDSCH) of the fourth random access message using the set of beams indicated by the indication, or wherein the base station transmits the indication in the PDCCH of the fourth random access message and transmits the PDSCH of the fourth random access message using the set of beams indicated in the PDCCH.

29. The method of claim 23, further comprising:
receiving hybrid automatic repeat request acknowledgement (HARQ-ACK) feedback in a physical uplink control channel (PUCCH) from the UE using time division multiplexing (TDM), frequency division multiplexing (FDM), or spatial division multiplexing (SDM) beam sweeping; and
transmitting information for the TDM, FDM, or SDM beam sweeping in at least one of a control part of the second random access message or the fourth random access message.

30. An apparatus for wireless communication at a base station, comprising:
means for receiving a first random access message from a user equipment (UE);
means for transmitting a second random access message to the UE, in response to the first random access message; and
means for receiving a third random access message at one or more transmission reception points (TRPs) on at least one of multiple beams that are monitored in a beam sweep pattern using resources for the beam sweep pattern of the third random access message based on at least one of a beam pool index or a TRP index.

* * * * *